(12) United States Patent (10) Patent No.: US 11,224,034 B2
Nam et al. (45) Date of Patent: Jan. 11, 2022

(54) CONFIGURING UPLINK CONTROL CHANNEL RESOURCES FOR COMMUNICATIONS IN A SHARED RADIO FREQUENCY SPECTRUM

(71) Applicant: QUALCOMM Incorporated, San Diego, CA (US)

(72) Inventors: Wooseok Nam, San Diego, CA (US); Zhifei Fan, San Diego, CA (US); Tao Luo, San Diego, CA (US); Yan Zhou, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 16/719,133

(22) Filed: Dec. 18, 2019

(65) Prior Publication Data

US 2020/0221446 A1 Jul. 9, 2020

Related U.S. Application Data

(60) Provisional application No. 62/789,878, filed on Jan. 8, 2019.

(51) Int. Cl.
*H04W 72/04* (2009.01)
*H04W 74/08* (2009.01)

(52) U.S. Cl.
CPC ... *H04W 72/0413* (2013.01); *H04W 74/0833* (2013.01); *H04W 72/044* (2013.01)

(58) Field of Classification Search
CPC ......... H04W 74/0833; H04W 74/0808; H04W 72/0413; H04W 72/0446; H04W 72/044
See application file for complete search history.

(56) References Cited

U.S. PATENT DOCUMENTS

2019/0045552 A1* 2/2019 Blankenship ............. H04L 1/08
2020/0214006 A1* 7/2020 Choi ..................... H04L 1/1861
(Continued)

FOREIGN PATENT DOCUMENTS

EP          3468280 A1    4/2019
WO     WO-2018004246 A1   1/2018

OTHER PUBLICATIONS

Huawei, et al., "Feature Lead Summary of HARQ Enhancement in NR-U", 3GPP Draft, 3GPP TSG RAN WG1 Meeting #95, R1-1814146 Feature Lead Summary of HARQ Enhancement in NR-U (RAN1_ 95) V3, 3rd Generation Partnership Project (3GPP), Mobile Competence Centre, 650, Route Des Lucioles, F-06921 Sophia-Ant, vol. RAN WG1, No. Spokane, USA, Nov. 12, 2018-Nov. 16, 2018, Nov. 19, 2018 (Nov. 19, 2018), XP051494603, 15 Pages, Retrieved from the Internet: URL: http://www.3gpp.org/ftp/tsg%5Fran/WG1% 5FRL1/TSGR1%5F95/Docs/R1%2D1814146%2Ezip, [retrieved on Nov. 19, 2018], the whole document.
(Continued)

*Primary Examiner* — Brian D Nguyen
(74) *Attorney, Agent, or Firm* — Liem T. Do

(57) ABSTRACT

A base station may access a channel following a successful channel access procedure. The base station may transmit an indication of a resource allocation to a user equipment (UE). The resource allocation may include an allocation of resources for subsequent communications between the base station and the UE, for example, defining a set of transmission time intervals (TTIs) during which the UE may transmit repetitions of uplink control information. The UE may also perform a channel access procedure to access the channel. The UE may transmit repetitions of the uplink control information using the set of TTIs according to the resource configuration. In some cases, the UE may stop transmitting uplink control information repetitions after a maximum number repetitions also according to the resource configu-
(Continued)

ration. The base station may then receive and combine the uplink control information.

30 Claims, 20 Drawing Sheets

(56) References Cited

U.S. PATENT DOCUMENTS

| | | | |
|---|---|---|---|
| 2020/0275436 A1* | 8/2020 | Lin | H04L 5/0094 |
| 2021/0126749 A1* | 4/2021 | Iyer | H04B 7/0482 |
| 2021/0136739 A1* | 5/2021 | Chen | H04L 1/00 |

OTHER PUBLICATIONS

Huawei, et al., "HARQ Enhancements in NR unlicensed", 3GPP Draft, 3GPP TSG RAN WGI Meeting #95, R1-1812196, 3rd Generation Partnership Project (3GPP), Mobile Competence Centre, 650, Route Des Lucioles, F-06921, Sophia-Antipolls Cedex, France, vol. RAN WG1, No. Spokane, USA, Nov. 12, 2018-Nov. 16, 2018, Nov. 11, 2018 (Nov. 11, 2018), XP051554068, 13 Pages, Retrieved from the Internet: URL: http://www.3gpp.org/ftp/Meetings%5F3GPP%5FSYNC/RAN1/Docs/R1%2D1812196%2Ezip, [retrieved on Nov. 11, 2018], Sections 3, 3.1, 3.2.

Interdigital Inc: "Harq Enhancements for NR-U", 3GPP Draft, 3GPP TSG RAN WG 1 Meeting #95, R1-1813222 HARQ Enhancements for NR-U, 3rd Generation Partnership Project (3GPP), Mobile Competence Centre, 650, Route Des Lucioles, F-06921 Sophia-Antipolis Cedex, France, vol. Ran WG1, No. Spokane, USA, Nov. 12, 2018-Nov. 16, 2018, Nov. 11, 2018 (Nov. 11, 2018), XP051555225, 7 Pages, Retrieved from the Internet: URL: http://www.3gpp.org/ftp/Meetings%5F3GPP%5FSYNC/RAN1/Docs/R1%2D1813222%2Ezip, [retrieved on Nov. 11, 2018], Sections 2, 3.

International Search Report and Written Opinion—PCT/US2019/067504—ISA/EPO—Mar. 19, 2020.

\* cited by examiner

CONFIGURING UPLINK CONTROL CHANNEL RESOURCES FOR COMMUNICATIONS IN A SHARED RADIO FREQUENCY SPECTRUM

CROSS REFERENCE

The present Application for Patent claims the benefit of U.S. Provisional Patent Application No. 62/789,878 by NAM et al., entitled "CONFIGURING UPLINK CONTROL CHANNEL RESOURCES FOR COMMUNICATIONS IN A SHARED RADIO FREQUENCY SPECTRUM," filed Jan. 8, 2019, assigned to the assignee hereof, and expressly incorporated by reference in its entirety.

BACKGROUND

The following relates generally to wireless communications and, more specifically, to configuring uplink control channel resources for communications in a shared radio frequency spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code-division multiple access (CDMA), time-division multiple access (TDMA), frequency-division multiple access (FDMA), orthogonal frequency-division multiple access (OFDMA), or discrete Fourier transform-spread-orthogonal frequency-division multiplexing (DFT-s-OFDM). A wireless multiple-access communications system may include a number of base stations or network access nodes, each simultaneously supporting communication for multiple communication devices, which may be otherwise known as user equipment (UE).

In some cases, a base station and a UE operating in shared or unlicensed spectrum may participate in contention-based access procedures prior to beginning communications (e.g., to determine whether resources are available for communication). After gaining access to resources for communication, the base station may communicate with the UE using one or more transmission time intervals (TTIs) (e.g., slots, mini-slots, symbols, etc.). In some cases, the UE may transmit repetitions of uplink control information to the base station in different TTIs.

SUMMARY

The described techniques relate to improved methods, systems, devices, and apparatuses that support configuring uplink control channel resources for communications in a shared radio frequency spectrum. For example, a base station may transmit configuration information to a user equipment (UE). In some cases, the configuration information may include an indication of a resource allocation. The resource allocation may include, for example, an allocation of time, frequency, and/or spatial resources for subsequent uplink and downlink communications between the base station and the UE, such as time, frequency, and/or spatial resources defining transmission time intervals (TTIs) during which the UE may transmit repetitions of uplink control information (e.g., in a physical uplink control channel (PUCCH)). The resource allocation may include a first parameter indicating a number of resources that are to be allocated for a corresponding number of TTIs for repetitions of the PUCCH and a second parameter indicating a maximum number of the repetitions of the PUCCH.

In some cases, the UE may perform one or more channel access procedures (e.g., a listen-before-talk (LBT) procedure) to determine whether the channel is available. Following a successful LBT procedure, the UE may transmit one or more repetitions of the uplink control information in subsequent repeated transmissions of the PUCCH using the configured TTIs corresponding to the time, frequency, and/or spatial resources signaled to the UE from the base station in the resource configuration. In some cases, the UE may stop transmitting additional PUCCH repetitions after the maximum number repetitions, for example, according to the second parameter. The base station may then receive and combine the PUCCH repetitions.

A method of wireless communications at a UE is described. The method may include receiving, from a base station, a resource configuration, the resource configuration including a first parameter indicating a set of TTIs for transmitting uplink control information in a shared radio frequency spectrum band, performing a channel access procedure to obtain access to the shared radio frequency spectrum band, and transmitting one or more instances of the uplink control information in one or more TTIs of the set of TTIs, where a number of the one or more instances is based on a conclusion of the channel access procedure and a number of TTIs in the set of TTIs.

An apparatus for wireless communications at a UE is described. The apparatus may include a processor, memory in electronic communication with the processor, and instructions stored in the memory. The instructions may be executable by the processor to cause the apparatus to receive, from a base station, a resource configuration, the resource configuration including a first parameter indicating a set of TTIs for transmitting uplink control information in a shared radio frequency spectrum band, perform a channel access procedure to obtain access to the shared radio frequency spectrum band, and transmit one or more instances of the uplink control information in one or more TTIs of the set of TTIs, where a number of the one or more instances is based on a conclusion of the channel access procedure and a number of TTIs in the set of TTIs.

Another apparatus for wireless communications at a UE is described. The apparatus may include means for receiving, from a base station, a resource configuration, the resource configuration including a first parameter indicating a set of TTIs for transmitting uplink control information in a shared radio frequency spectrum band, performing a channel access procedure to obtain access to the shared radio frequency spectrum band, and transmitting one or more instances of the uplink control information in one or more TTIs of the set of TTIs, where a number of the one or more instances is based on a conclusion of the channel access procedure and a number of TTIs in the set of TTIs.

A non-transitory computer-readable medium storing code for wireless communications at a UE is described. The code may include instructions executable by a processor to receive, from a base station, a resource configuration, the resource configuration including a first parameter indicating a set of TTIs for transmitting uplink control information in a shared radio frequency spectrum band, perform a channel access procedure to obtain access to the shared radio frequency spectrum band, and transmit one or more instances of the uplink control information in one or more TTIs of the set of TTIs, where a number of the one or more instances is based on a conclusion of the channel access procedure and a number of TTIs in the set of TTIs.

Some examples of the method, apparatuses, and non-transitory computer-readable medium described herein may further include operations, features, means, or instructions for receiving, in the resource configuration, a second parameter indicating a maximum number of instances for the uplink control information to be transmitted, where the one or more TTIs may be subsequent to the conclusion of the channel access procedure, and the number of the one or more instances may be less than or equal to the maximum number of instances.

In some examples of the method, apparatuses, and non-transitory computer-readable medium described herein, the transmitted one or more instances of the uplink control information include one or more indexes for corresponding ones of the TTIs. In some examples of the method, apparatuses, and non-transitory computer-readable medium described herein, the one or more indexes indicate a last instance of the uplink control information.

Some examples of the method, apparatuses, and non-transitory computer-readable medium described herein may further include operations, features, means, or instructions for transmitting an uplink communication using one or more TTIs of the set of TTIs subsequent to the one or more TTIs used to transmit the maximum number of instances for the uplink control information. In some examples of the method, apparatuses, and non-transitory computer-readable medium described herein, the uplink communication includes data transmitted using a physical uplink shared channel, data transmitted using a physical random access channel, a reference signal, or a combination thereof.

In some examples of the method, apparatuses, and non-transitory computer-readable medium described herein, the one or more TTIs may be subsequent to the conclusion of the channel access procedure, and the number of the one or more instances may be based on a number of the one or more TTIs that may be subsequent to the conclusion of the channel access procedure. Some examples of the method, apparatuses, and non-transitory computer-readable medium described herein may further include operations, features, means, or instructions for receiving an indication not to transmit one or more instances of the uplink control information during one or more TTIs based on transmitting at least one of the one or more instances of the uplink control information.

Some examples of the method, apparatuses, and non-transitory computer-readable medium described herein may further include operations, features, means, or instructions for transmitting the one or more instances of the uplink control information using one or more TTIs of the set of TTIs that may be subsequent to the conclusion of the channel access procedure, where the number of the one or more instances may be based on a failure of the channel access procedure to obtain access to the shared radio frequency spectrum band.

In some examples of the method, apparatuses, and non-transitory computer-readable medium described herein, the resource configuration indicates time-frequency resources for each of the set of TTIs for transmitting uplink control information.

In some examples of the method, apparatuses, and non-transitory computer-readable medium described herein, the resource configuration indicates a spatial relationship for one or more transmit beams to be used for transmitting the one or more instances of the uplink control information.

In some examples of the method, apparatuses, and non-transitory computer-readable medium described herein, the number of TTIs for transmitting uplink control information may be contiguous in time, frequency, or both. In some examples of the method, apparatuses, and non-transitory computer-readable medium described herein, the number of TTIs for transmitting uplink control information may be not contiguous in time, frequency, or both.

In some examples of the method, apparatuses, and non-transitory computer-readable medium described herein, the channel access procedure includes an LBT procedure. In some examples of the method, apparatuses, and non-transitory computer-readable medium described herein, the uplink control information may be transmitted using a PUCCH.

A method of wireless communications is described. The method may include transmitting a first resource configuration, the resource configuration including a first parameter indicating a first set of TTIs for communicating uplink control information in a shared radio frequency spectrum band, determining a second set of TTIs for receiving uplink control information in the shared radio frequency spectrum band based on a number of instances of uplink control information that were received during the first set of TTIs, and transmitting a second resource configuration, the second resource configuration including a third parameter indicating the determined second set of TTIs.

An apparatus for wireless communications is described. The apparatus may include a processor, memory in electronic communication with the processor, and instructions stored in the memory. The instructions may be executable by the processor to cause the apparatus to transmit a first resource configuration, the resource configuration including a first parameter indicating a first set of TTIs for communicating uplink control information in a shared radio frequency spectrum band, determine a second set of TTIs for receiving uplink control information in the shared radio frequency spectrum band based on a number of instances of uplink control information that were received during the first set of TTIs, and transmit a second resource configuration, the second resource configuration including a third parameter indicating the determined second set of TTIs.

Another apparatus for wireless communications is described. The apparatus may include means for transmitting a first resource configuration, the resource configuration including a first parameter indicating a first set of TTIs for communicating uplink control information in a shared radio frequency spectrum band, determining a second set of TTIs for receiving uplink control information in the shared radio frequency spectrum band based on a number of instances of uplink control information that were received during the first set of TTIs, and transmitting a second resource configuration, the second resource configuration including a third parameter indicating the determined second set of TTIs.

A non-transitory computer-readable medium storing code for wireless communications is described. The code may include instructions executable by a processor to transmit a first resource configuration, the resource configuration including a first parameter indicating a first set of TTIs for communicating uplink control information in a shared radio frequency spectrum band, determine a second set of TTIs for receiving uplink control information in the shared radio frequency spectrum band based on a number of instances of uplink control information that were received during the first set of TTIs, and transmit a second resource configuration, the second resource configuration including a third parameter indicating the determined second set of TTIs.

Some examples of the method, apparatuses, and non-transitory computer-readable medium described herein may further include operations, features, means, or instructions for determining the second set of TTIs for receiving uplink control information based on the number of instances of uplink control information that were received during the first set of TTIs exceeding a threshold number of instances, where a number of TTIs of the second set of TTIs may be greater than a number of TTIs of the first set of TTIs.

Some examples of the method, apparatuses, and non-transitory computer-readable medium described herein may further include operations, features, means, or instructions for determining the second set of TTIs for receiving uplink control information based on the number of instances of uplink control information that were received during the first set of TTIs not exceeding a threshold number of instances, where a number of TTIs of the second set of TTIs may be less than a number of TTIs of the first set of TTIs.

In some examples of the method, apparatuses, and non-transitory computer-readable medium described herein, the uplink control information may be transmitted using a PUCCH.

DETAILED DESCRIPTION

Figure 1:
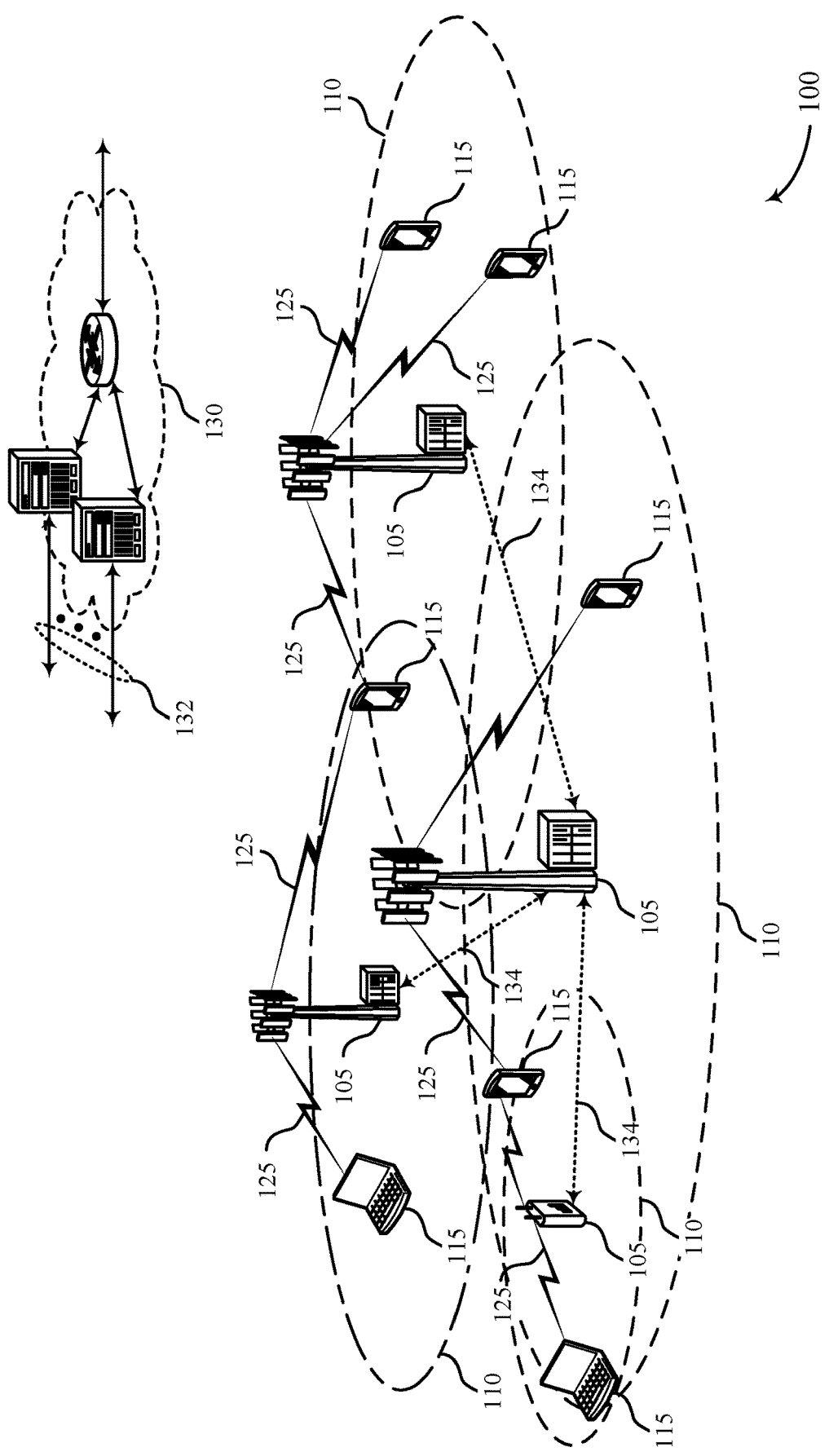
FIG. 1 illustrates an example of a wireless communications system that supports configuring uplink control channel resources for communications in a shared radio frequency spectrum in accordance with aspects of the present disclosure.

In some wireless communications systems, such as a fifth generation (5G) or New Radio (NR) system, a wireless device such as a user equipment (UE) may transmit uplink control information to a base station, for example, via a physical uplink control channel (PUCCH). The base station may determine and signal to the UE a resource configuration including a set of time, frequency, and/or spatial resources for the UE to use for one or more subsequent PUCCH transmissions and when the UE may use the transmission resources (e.g., during which of a set of transmission time intervals (TTIs), which may also be known as a slot, that the UE is to send the uplink control information via the PUCCH).

Techniques discussed herein provide for configuring the UE with such time and/or frequency resources for repeated PUCCH transmissions. For example, the base station may configure the UE with a set of TTIs to be used for the repeated PUCCH transmissions. In some cases, the base station may signal a first parameter N indicating that N resources are to be allocated to N TTIs for PUCCH repetitions. In some cases, the base station may also signal a second parameter M indicating a maximum number M PUCCH retransmissions. The base station may include the first parameter N and the second parameter M in, for example, the resource configuration signaled to the UE. In some cases, the described PUCCH repetition techniques may provide coverage enhancement and/or also multiple opportunities during which the UE may perform listen-before-talk (LBT) procedures to contend for the medium.

That is, for example, the base station may transmit configuration information to the UE during a connection setup procedure. In some cases, the configuration information may include an indication of a resource allocation. The resource allocation may include, for example, an allocation of time, frequency, and/or spatial resources for subsequent uplink and downlink communications between the base station and the UE, including, for example, time-frequency resources defining TTIs during which the UE may transmit repetitions of the PUCCH. The resource allocation may include the first parameter N indicating that N resources are to be allocated for N TTIs for repetitions of the PUCCH and the second parameter M indicating a maximum number M repetitions of the PUCCH.

In some cases, the UE may perform one or more channel access procedures (e.g., an LBT procedure) to determine whether the channel is available. Following a successful LBT procedure, the UE may transmit one or more repetitions of the uplink control information in subsequent repeated transmissions of the PUCCH using the N configured TTIs corresponding to time, frequency, and/or spatial resources signaled to the UE from the base station in the resource configuration. In some cases, the UE may stop transmitting subsequent PUCCH repetitions after a maximum number M repetitions according to the second parameter M For example, after transmitting M repetitions of the PUCCH, the UE may truncate the remaining TTIs that may have been allocated for PUCCH retransmissions. The base station may receive and combine the PUCCH repetitions, which may facilitate relatively improved performance for communications between the UE and the base station.

Aspects of the disclosure are described in the context of wireless communications systems. Aspects of the disclosure are also described in the context of transmission timelines and a process flow that relate to configuring uplink control channel resources for communications in a shared radio frequency spectrum. Aspects of the disclosure are further illustrated by and described with reference to apparatus diagrams, system diagrams, and flowcharts that relate to configuring uplink control channel resources for communications in a shared radio frequency spectrum.

FIG. 1 illustrates an example of a wireless communications system 100 that supports configuring uplink control channel resources for communications in a shared radio frequency spectrum in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2,Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a carrier aggregation (CA) configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency-division duplexing (FDD), time-division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunications system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or discrete Fourier transform-spread-OFDM (DFT-s-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a CA configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time-division multiplexing (TDM) techniques, frequency-division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink component carriers and one or more uplink component carriers according to a CA configuration. CA may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Techniques discussed herein provide options by which the UE may be configured with time and/or frequency resources for repeated PUCCH transmissions (which may also be referred to as PUCCH repetitions, PUCCH retransmissions, etc.). For example, the base station may configure a set of TTIs to be used for the repeated PUCCH transmissions. In some cases, the base station may signal a first parameter indicating that a number of resources are to be allocated for the repeated PUCCH transmissions. In some cases, the base station may also signal a second parameter indicating a maximum number of retransmissions for the repeated PUCCH transmissions.

The UE may perform one or more channel access procedures (e.g., an LBT procedure) to determine whether the channel is available. Following a successful LBT procedure, the UE may transmit one or more repetitions of the uplink control information in subsequent retransmissions of the PUCCH using the configured resources signaled to the UE from the base station. In some cases, the UE may stop transmitting further PUCCH repetitions after the maximum number repetitions according to the second parameter.

The base station may then receive and combine each of the received repeated transmissions of the uplink control information. In this way, the UE may communicate to the base station the uplink control information with a degree of redundancy across the repetitions. This redundancy may also, in some cases, allow the UE to transmit with a relatively improved signal-to-interference-plus-noise ratio from one transmission to another. According to some techniques described herein, the base station may signal to the UE to stop transmitting repetitions of the uplink control information earlier than the UE may otherwise stop (e.g., according to the configured resources), for example, according to the first and second parameters. This may, for example, conserve power at the UE by reducing a number of duplicative transmissions beyond what may be sufficient, if, for example, the base station determines that the earlier received instances of the PUCCH are sufficient to decode the information communicated in the duplicate transmissions. In some cases, the base station may signal a new or updated resource allocation to the UE. For example, the base station may decrease resources to be used for repetitions to conserve the frequency, time, and/or spatial resources such that these resources may be allocated to other channels and/or for communications with other device, which may also relatively improve power efficiency at the UE.

Figure 2A:
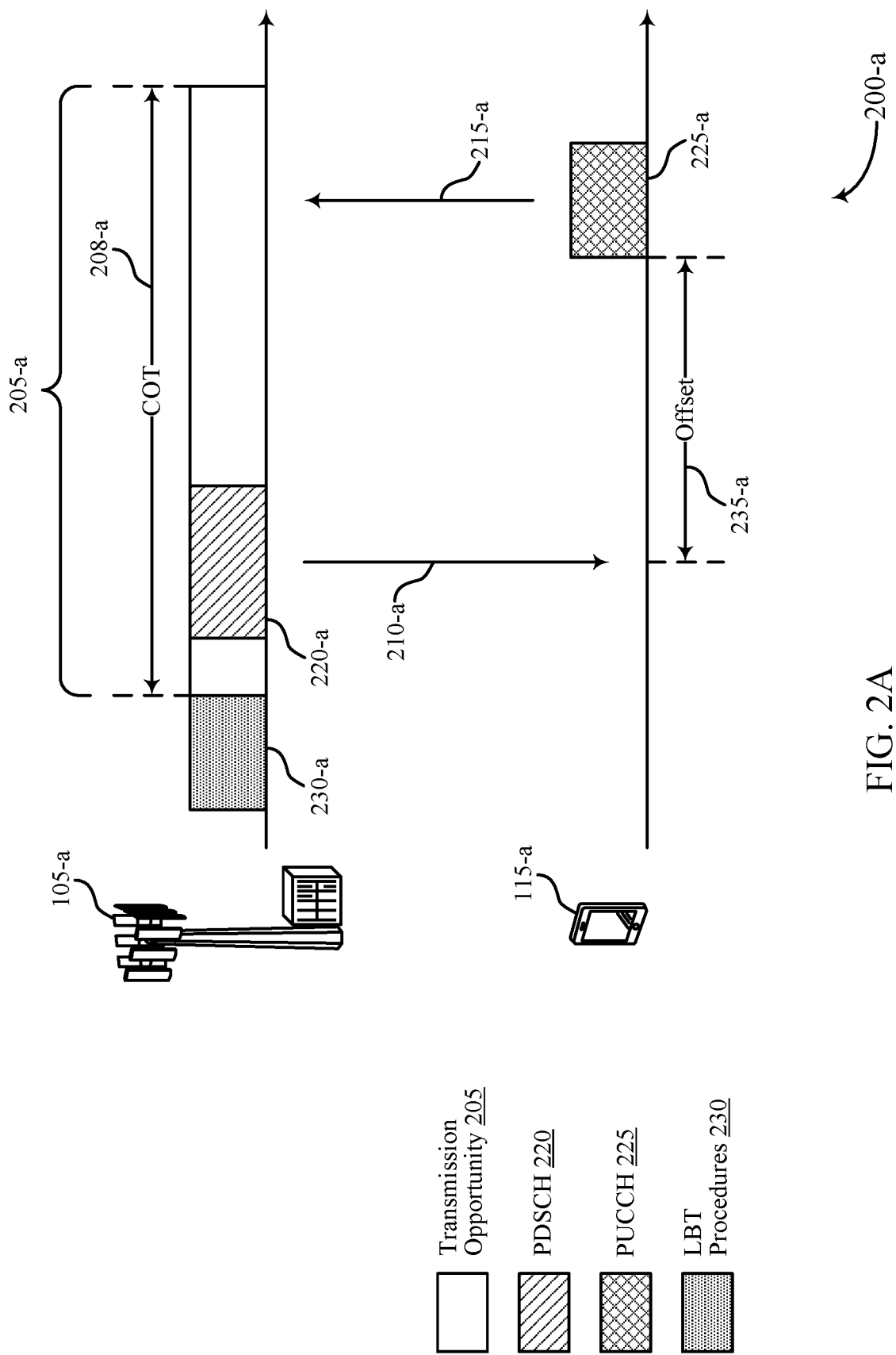
FIGS. 2A and 2B illustrate example transmission timelines that support configuring uplink control channel resources for communications in a shared radio frequency spectrum in accordance with aspects of the present disclosure.
Figure 2B:
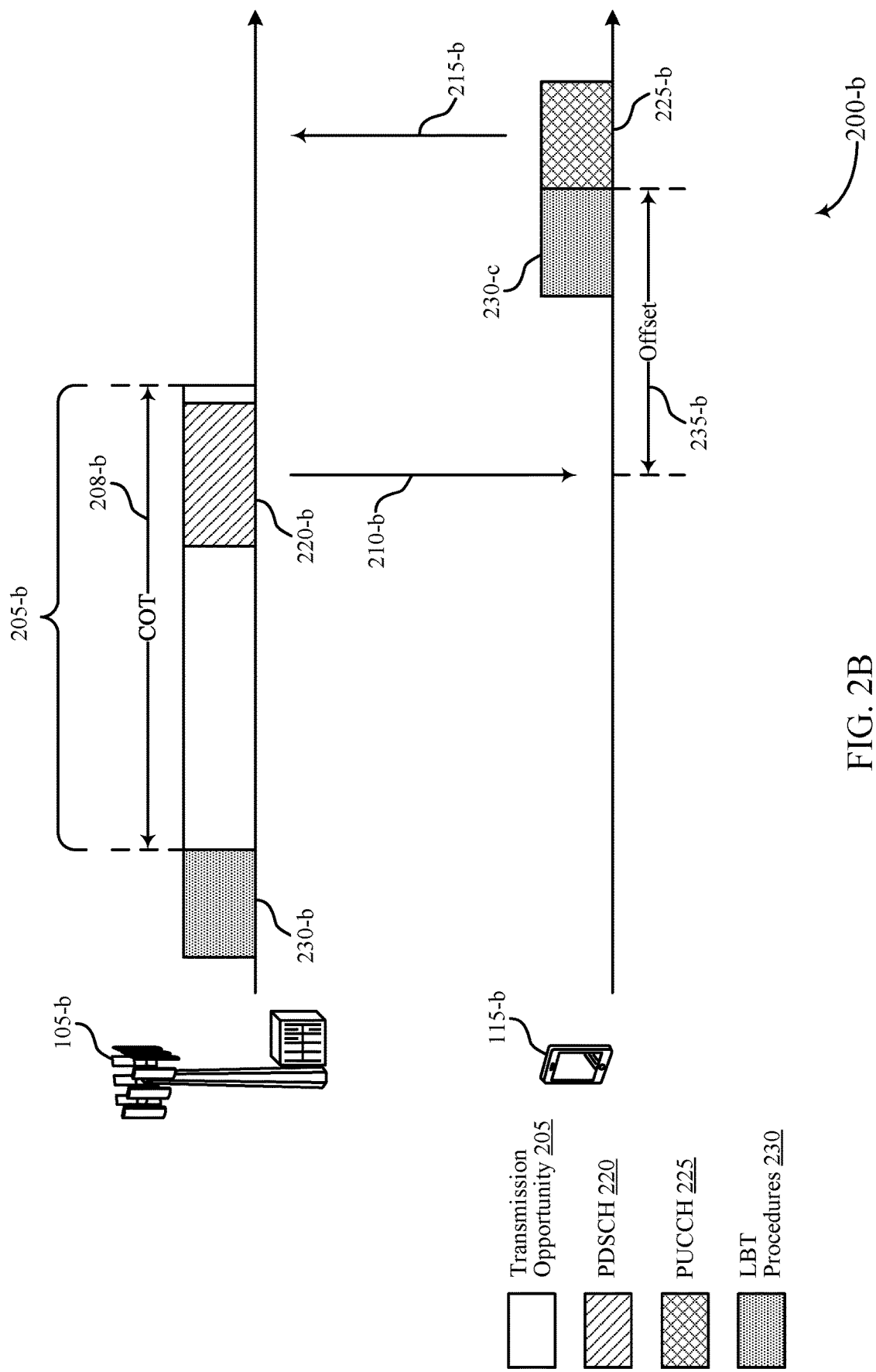

FIGS. 2A and 2B illustrate example transmission timelines 200 that support configuring uplink control channel resources for communications in a shared radio frequency spectrum in accordance with aspects of the present disclosure. The transmission timelines 200 illustrate transmission schemes and frame structure designs for communications in a wireless communications system operating in the shared radio frequency spectrum, which may implement aspects of the wireless communications system 100 as described with reference to FIG. 1. The wireless communications system may include one or more base stations 105 and one or more UEs 115, which may be examples of the corresponding devices as described with reference to FIG. 1.

FIG. 2A illustrates an example transmission timeline 200-a that supports configuring uplink control channel resources for communications in a shared radio frequency spectrum in accordance with aspects of the present disclosure. The transmission timeline 200a illustrates a transmission scheme and frame structure design for communications in a wireless communications system operating in the shared radio frequency spectrum, which may implement aspects of the wireless communications system 100 as described with reference to FIG. 1. The wireless communications system includes a base station 105-a and a UE 115-a, which may be examples of the corresponding devices as described with reference to FIG. 1. The transmission timeline 200-a illustrates an example transmission scheme in which the UE 115-a transmits uplink control information to the base station 105-a during a transmission opportunity 205-a, for example, initiated by the base station 105-a.

The base station 105-a and the UE 115-a may operate in a shared or unlicensed radio frequency spectrum bandwidth. The base station 105-a may transmit downlink information 210-a to the UE 115-a, and the UE 115-a may transmit uplink information 215-a to the base station 105-a. The base station 105-a may, for example, transmit the downlink information 210-a to the UE 115-a in a physical downlink shared channel (PDSCH) 220-a. The downlink information 210-a may include, for example, downlink control information and a data payload. The UE 115-a may transmit the uplink information 215-a to the base station 105-a using the shared radio frequency spectrum bandwidth, for example, in a PUCCH 225-a. The uplink information 215-a may include, for example, HARQ feedback and/or other uplink control information. In some cases, downlink transmissions from the base station 105-a to the UE 115-a may be referred to as forward link transmissions, and uplink transmissions from the UE 115-a to the base station 105-a may be referred to as reverse link transmissions.

Before establishing and initiating communications, the base station 105-a may utilize a channel access procedure to determine whether the time and frequency resources for the channel are available, which may prevent interference and collisions with communications between another UE 115 and the base station 105-a, another UE 115 and another base station 105, higher priority transmissions (e.g., radar), etc. For example, the base station 105-a may perform an opportunistic contention-based channel access procedure (e.g., an LBT procedure 230-a, or, alternatively, a clear channel assessment (CCA) procedure, etc.) to contend for access to a transmission medium or channel to communicate with the UE 115-a. For example, as shown in FIG. 2A, the base station 105-a may perform the LBT procedure 230a before the transmission opportunity 205-a.

In some cases, as shown in the example transmission timeline 200-a of FIG. 2A, the base station 105-a may determine that the channel is available via the LBT procedure 230-a. That is, the LBT procedure 230-a may indicate to the base station 105-a that the time-frequency resources of the channel are not occupied by communications to or from other nearby communications devices. Upon determining that the channel is available via the LBT procedure 230-a, the base station 105-a may extend a duration of the transmission opportunity 205-a to a duration of a channel occupancy time (COT) 208-a (i.e., a duration of time during which the channel may be occupied by communications between the base station 105-a and the UE 115-a).

The base station 105-a may then access the channel and transmit the downlink information 210-a to the UE 115-a. In some cases, the downlink information 210-a may include an indication (e.g., via one or more indicator bits) of a resource allocation. In some cases, the base station 105-a may transmit the resource configuration to the UE 115-a via dedicated resources (e.g., via a different carrier of a multiple carrier or CA configuration). The resource allocation may include an allocation of time, frequency, and/or spatial resources for subsequent uplink and downlink communications between the base station 105-a and the UE 115-a, including, for example, time-frequency resources that the UE 115-a may use to transmit the PUCCH 225-a.

Following a duration of an offset 235-a (e.g., a HARQ offset), the UE 115-a may transmit the uplink information 215-a to the base station 105-a in the PUCCH 225-a. For example, the base station 105-a may configure (e.g., via a downlink transmission in the PDSCH 220-a) the offset 235-a (signaled to the UE 115-a, e.g., via a HARQ offset parameter) for the UE 115-a, where the offset 235-a may be a number of symbols for the UE 115-a to wait following the PDSCH 220-a before transmitting the PUCCH 225-a. The uplink information 215-a may include, for example, HARQ feedback and/or other uplink control information.

As shown in FIG. 2A, the UE 115-a may transmit such HARQ feedback (e.g., ACK/NACK feedback) in the PUCCH 225-a during the transmission opportunity 205-a, where, as described above, the base station 105-a may have successfully performed the LBT procedure 230-a to contend for the resources to be used during the transmission opportunity 205-a. Additionally or alternatively, the UE 115-a may also perform a channel access procedure to determine whether the time, frequency, spatial resources for the channel are available. For example, the UE 115-a may perform an opportunistic contention-based channel access procedure (e.g., an LBT procedure, or, alternatively, a CCA procedure, etc.) to contend for access to the channel to be used to transmit the PUCCH 225-a. This LBT procedure may, in some cases, be an LBT procedure of a relatively shorter duration (e.g., a category 2 (CAT2)) and may confirm to the UE 115-a that the time, frequency, and spatial resources for the channel are available for the UE 115-a to transmit the PUCCH 225-a.

FIG. 2B illustrates an example transmission timeline 200-b that supports configuring uplink control channel resources for communications in a shared radio frequency spectrum in accordance with aspects of the present disclosure. The transmission timeline 200-b illustrates a transmission scheme and frame structure design for communications in a wireless communications system operating in the shared radio frequency spectrum, which may implement aspects of the wireless communications system 100 as described with reference to FIG. 1. The wireless communications system includes a base station 105-b and a UE 115-b, which may be examples of the corresponding devices as described with reference to FIG. 1. The transmission timeline 200-b illustrates an example transmission scheme in which the UE 115-b transmits uplink control information to the base station 105-b following a transmission opportunity 205-b, for example, initiated by the base station 105-b.

As similarly described with reference to FIG. 2A, the base station 105-b and the UE 115-b may operate in a shared or unlicensed radio frequency spectrum bandwidth. The base station 105-b may transmit downlink information 210-b to the UE 115-b, and the UE 115-b may transmit uplink information 215-b to the base station 105-b. The base station 105-b may, for example, transmit the downlink information 210-b to the UE 115-b in a PDSCH 220-b. The downlink information 210-b may include, for example, downlink control information and a data payload. The UE 115-b may transmit the uplink information 215-b to the base station 105-b using the shared radio frequency spectrum bandwidth, for example, in a PUCCH 225-b. The uplink information 215-b may include, for example, HARQ feedback and/or other uplink control information.

Before establishing and initiating communications, the base station 105-b may utilize a channel access procedure to determine whether the time, frequency, and spatial resources for the channel are available, which may prevent interference and collisions with communications between another UE 115 and the base station 105-b, another UE 115 and another base station 105, higher priority transmissions, and the like. For example, the base station 105-b may perform an opportunistic contention-based channel access procedure (e.g., an LBT procedure 230-b, or, alternatively, a CCA procedure, etc.) to contend for access to a transmission medium or channel to communicate with the UE 115-b. As shown in the example transmission timeline 200-b of FIG. 2B, the base station 105-b may determine that the channel is available via the LBT procedure 230-b. That is, the LBT procedure 230-b may indicate to the base station 105-b that the time-frequency resources of the channel are not occupied by communications to or from other nearby communications devices. Upon determining that the channel is available via the LBT procedure 230-b, the base station 105-b may extend a duration of the transmission opportunity 205-b to a duration of a COT 208-b.

The base station 105-b may then access the channel and transmit the downlink information 210-b to the UE 115-b. In some cases, the downlink information 210-b may include an indication (e.g., via one or more indicator bits) of a resource allocation. In some cases, the base station 105-b may transmit the resource configuration to the UE 115-b via dedicated resources (e.g., via a different carrier of a multiple carrier or CA configuration). The resource allocation may include an allocation of time, frequency, and/or spatial resources for subsequent uplink and downlink communications between the base station 105-*b* and the UE 115-*b*, including, for example, time-frequency resources on which the UE 115-*b* may transmit the PUCCH 225-*b*.

Following a duration of an offset 235-*b* (e.g., a HARQ offset), the UE 115-*b* may transmit the uplink information 215-*b* to the base station 105-*b* in the PUCCH 225-*b*. For example, the base station 105-*b* may configure (e.g., via a downlink transmission in the PDSCH 220-*b*) the offset 235-*b* (signaled to the UE 115-*b*, e.g., via a HARQ offset parameter) for the UE 115-*b*, where the offset 235-*b* may be a number of symbols for the UE 115-*b* to wait following the PDSCH 220-*b* before transmitting the PUCCH 225-*b*. The uplink information 215-*b* may include, for example, HARQ feedback and/or other uplink control information.

In some cases, as shown in FIG. 2B, the UE 115-*b* may utilize a channel access procedure (e.g., an LBT procedure 230-*c*) before transmitting to the base station 105-*b*, and following a duration of an offset 235-*b* (e.g., a HARQ offset). For example, the UE 115-*b* may perform the LBT procedure 230-*c* to contend for access to the channel to communicate with the base station 105-*b*. That is, the UE 115-*b* may perform LBT procedure 230-*a* to determine whether the time, frequency, and spatial resources for the channel on which the UE 115-*b* is to transmit uplink control information in the PUCCH 225-*b* are available.

In some cases, as shown in the example of FIG. 2B, the UE 115-*b* may determine that the channel is available via the LBT procedure 230-*c*, and the UE 115-*b* may acquire a further transmission opportunity 205 during which to transmit that is subsequent to the transmission opportunity 205-*b*. That is, the LBT procedure 230-*c* may indicate to the UE 115-*b* that the time-frequency resources of the channel are not occupied by communications to or from other nearby communications devices. Upon determining that the channel is available via the LBT procedure 230-*c*, the UE 115-*b* may transmit the uplink information 215-*b* to the base station 105-*b* in the PUCCH 225-*b*.

In some cases, the UE 115-*b* may transmit at least a portion of the same information (e.g., some or all of the same information) transmitted in the PUCCH 225-*b* in one or more subsequent PUCCH transmissions. For example, via the transmitted resource configuration, the base station 105-*b* may configure the UE 115-*b* with a set of multiple TTIs in the time domain (e.g., multiple slots, subframes, etc.) during which the UE 115-*b* may repeat transmission of the control information in subsequent PUCCH transmissions (e.g., retransmit the PUCCH information) using one or more subsequent TTIs (e.g., subsequent slots). In this case, the UE 115-*b* may transmit to the base station 105-*b* multiple repetitions (i.e., multiple instances) of the information previously transmitted in the PUCCH 225-*b* in each of the allocated TTIs. The base station 105-*b* may receive and combine the PUCCH repetitions, which may facilitate relatively improved performance for communications between the UE 115-*b* and the base station 105-*b*, for example, providing for relative signal-to-interference-plus-noise ratio improvements.

In some cases, time, frequency, and/or spatial resources allocated for the repeated transmissions of the PUCCH 225-*b* may include at least partially different portions of (or, e.g., entirely non-overlapping portions of) the shared radio frequency spectrum bandwidth than one or more of the previous PUCCH repetitions. In some cases, each repetition of the PUCCH may be allocated to a corresponding TTI, where each of the TTIs may be contiguous in time. Alternatively, the repetitions of the PUCCH may be allocated to TTIs that are not contiguous in time (i.e., with gaps in time between one or more of the TTIs allocated for PUCCH repetitions).

That is, the UE 115-*b* may be allocated non-contiguous time and/or frequency resources (e.g., non-contiguous or distributed uplink slots) on which to transmit the PUCCH repetitions to the base station 105-*b*. If, for example, the TTIs allocated for PUCCH repetitions are distributed (i.e., non-contiguous), the UE 115-*b* may perform subsequent LBT procedures 230 corresponding to each of the distributed TTIs (e.g., following a transmission gap or idle period). In this case, each of the repeated PUCCH transmissions may depend on a prior successful LBT procedure 230 acquiring a transmission opportunity, that is, identifying the resources as available for communications. If the UE 115-*b* fails to acquire a transmission opportunity for a repeated PUCCH transmission, the UE 115-*b* may drop (i.e., not transmit) that PUCCH repetition.

Various techniques discussed herein provide for configured the UE 115-*b* with time, frequency, and/or spatial resources for repeated PUCCH transmissions. For example, the base station 105-*b* may configure a set of TTIs to be used for the repeated PUCCH transmissions. In some cases, the base station 105-*b* may signal a first parameter N indicating that N resources are to be allocated to N TTIs for PUCCH repetitions. In some cases, the base station 105-*b* may signal a second parameter M indicating a maximum number MPUCCH retransmissions (where, e.g., M≤N). For example, the base station 105-*b* may include the first parameter N and the second parameter M in the resource configuration transmitted to the UE 115-*b*. In some cases, the resource configuration may indicate to the UE 115-*b* a spatial relationship for one or more transmit beams to be used for transmitting the one or more repetitions of the PUCCH. In some cases, the described PUCCH repetition techniques may provide coverage enhancement and/or also multiple opportunities during which the UE 115-*b* may perform LBT procedures 230 to contend for the medium.

Figure 3:
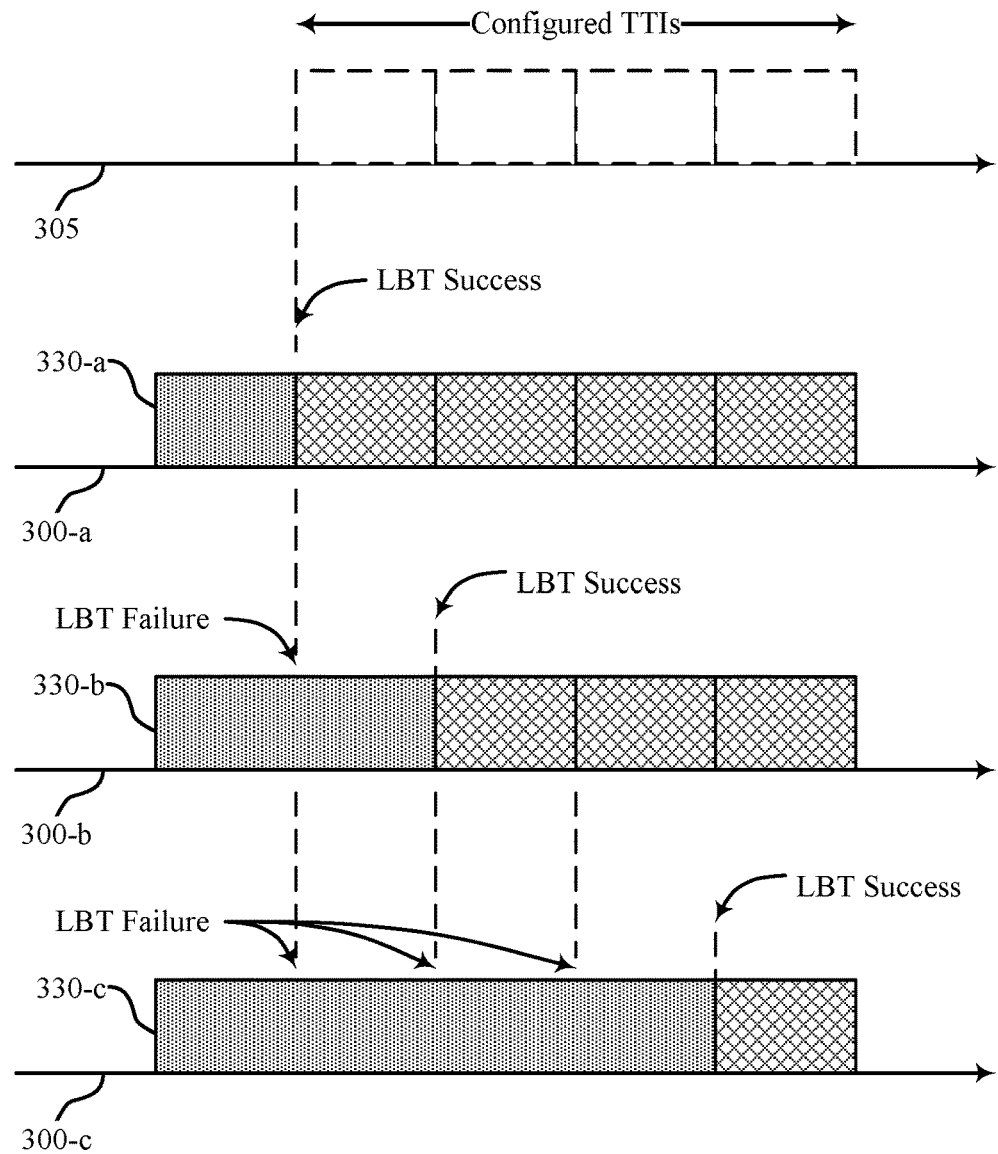
FIG. 3 illustrates example transmission timelines that support configuring uplink control channel resources for communications in a shared radio frequency spectrum in accordance with aspects of the present disclosure.

FIG. 3 illustrates example transmission timelines 300 that support configuring uplink control channel resources for communications in a shared radio frequency spectrum in accordance with aspects of the present disclosure. The transmission timelines 300 illustrate transmission schemes and frame structure designs for communications in a wireless communications system operating in the shared radio frequency spectrum, which may implement aspects of the wireless communications system 100 as described with reference to FIG. 1 and the transmission timelines 200 as described with reference to FIGS. 2A and 2B. The transmission timelines 300 show example communications between a base station and a UE, which may be examples of the corresponding devices as described with reference to FIGS. 1 and 2. The transmission timelines 300 illustrate an example transmission scheme in which the UE transmits multiple repetitions of uplink control information (e.g., multiple PUCCH retransmissions) to the base station following successful or failed LBT procedures 330.

FIG. 3 shows three transmission timelines 300, including a first transmission timeline 300-*a*, a second transmission timeline 300-*b*, and a third transmission timeline 300-*c*. Each of the of the transmission timelines 300 shows communications at the UE aligned with a configuration timeline 305. The configuration timeline 305 shows four configured TTIs 310 (e.g., slots, PUCCH slots, subframes, symbols, etc.), as may be configured by the base station according to a resource allocation. It is to be understood that the illustration of four configured TTIs 310 is only an example resource allocation, and a resource allocation may contain any number of contiguous or non-contiguous configured TTIs 310.

As similarly described herein, the base station may access a channel (i.e., configured time-frequency resources) of a shared radio frequency spectrum, for example, following a successful channel access procedure (e.g., an LBT procedure). The base station may then transmit downlink information to the UE using the channel. In some cases, the downlink information may include an indication (e.g., via one or more indicator bits in a resource configuration) of the resource allocation. The resource allocation may include, for example, an allocation of time, frequency, and/or spatial resources for subsequent uplink and downlink communications between the base station and the UE, including, for example, time-frequency resources defining the configured TTIs 310 during which the UE may transmit repetitions of uplink control information (e.g., via a PUCCH 325).

In some cases, the resource configuration may indicate to the UE a spatial relationship for one or more transmit beams to be used for transmitting the one or more repetitions of the PUCCH 325, in which case the UE may transmit the PUCCH 325 using the correspondingly configured transmit beam or beams. The resource allocation may further, in some cases, include a first parameter N indicating that N resources (e.g., time resources defining the configured TTIs 310) are to be allocated for N TTIs for repetitions of the PUCCH 325 and a second parameter M indicating a maximum number M repetitions of the PUCCH 325. In the example of FIG. 3, as the resource allocation includes resources allocated for four configured TTIs 310, the first parameter N is set to 4 (i.e., there are four configured TTIs 310), and the second parameterM may also be set to 4 (i.e., corresponding to a maximum of four repetitions of the PUCCH 325). That is, in the example of FIG. 3, N=M.

In some cases, as similarly described herein, the UE may perform one or more channel access procedures (e.g., LBT procedures 330) to determine whether the channel is available. The UE may, for example, perform an LBT procedure 330 before transmitting a first transmission of the PUCCH 325 of a sequence of one or more contiguous (i.e., consecutive) repetitions of the PUCCH 325. Following a successful LBT procedure 330-*a*, the UE may transmit one or more repetitions of the uplink control information in subsequent repeated transmissions of the PUCCH 325 using the N configured TTIs 310 corresponding to the time, frequency, and/or spatial resources signaled to the UE from the base station in the resource configuration. That is, the UE may transmit to the base station, according to the first parameter N, N repetitions (i.e., N instances) of the PUCCH 325 (including the uplink control information) in each of the configured TTIs 310 corresponding to the resources allocated by the base station. For example, as shown by the transmission timeline 300-*a*, the UE may successfully perform the LBT procedure 330-*a*. Following the successful LBT procedure 330-*a*, the UE may transmit a sequence of four repetitions of the PUCCH 325 using each of the four configured TTIs 310 (e.g., consecutively, as shown in FIG. 3).

In some cases, the UE may perform further LBT procedures 330 prior to subsequent PUCCH 325 repetitions to determine whether the medium is available for transmission (e.g., in the case of non-contiguously configured time and/or frequency resources). If, for example, one or more of such LBT procedures 330 are not successful, the UE may transmit a number of transmission less than N as these corresponding PUCCH 325 repetitions may not be transmitted (e.g., the UE transmits a number N repetitions minus the number of failed LBT procedures 330). In some cases, the UE may stop transmitting subsequent PUCCH 325 repetitions after a maximum number M repetitions according to the second parameter M That is, after transmitting M repetitions of the PUCCH 325, the UE may truncate the remaining TTIs that may have been allocated for PUCCH 325 retransmissions.

For example, as shown by the transmission timeline 300-*b*, the UE may first obtain a failure of the LBT procedure 330-*b*. Thus, the UE may drop a first transmission of the PUCCH 325 in the first configured TTI 310, and the UE may continue to perform the LBT procedure 330-*b*. Then, the UE may obtain a successful result of the LBT procedure 330-*b*. Following the successful LBT procedure 330-*b*, the UE may transmit a sequence of three repetitions of the PUCCH 325 using each of the three remaining configured TTIs 310.

In a second example, as shown by the transmission timeline 300-*c*, the result of the LBT procedure 330-*c* may be a failure in each of the first three instances. Thus, the UE may drop each successive transmission of the PUCCH 325 in the corresponding configured TTIs 310 so that the UE may continue to perform the LBT procedure 330-*c*. Then, the UE may obtain a successful result of the LBT procedure 330-*c*. Following the successful LBT procedure 330-*c*, the UE may transmit the PUCCH 325 using the remaining configured TTI 310.

As similarly described herein, the base station may receive and combine PUCCH 325 repetitions, which may facilitate relatively improved performance for communications between the UE and the base station. In some cases, if, for example, the base station successfully receives one or more transmissions of the PUCCH 325 before the end of the N configured TTIs 310, the base station may transmit an indication to the UE to stop further repetition of the PUCCH 325. That is, the base station may signal to the UE to terminate repetition of the PUCCH 325 earlier than the UE may otherwise according to the parameters of M and N. This may, for example, conserve power at the UE by reducing a number of duplicative transmissions, if, for example, the base station determined that the already received one or more instances of the PUCCH 325 are sufficient.

Figure 4:
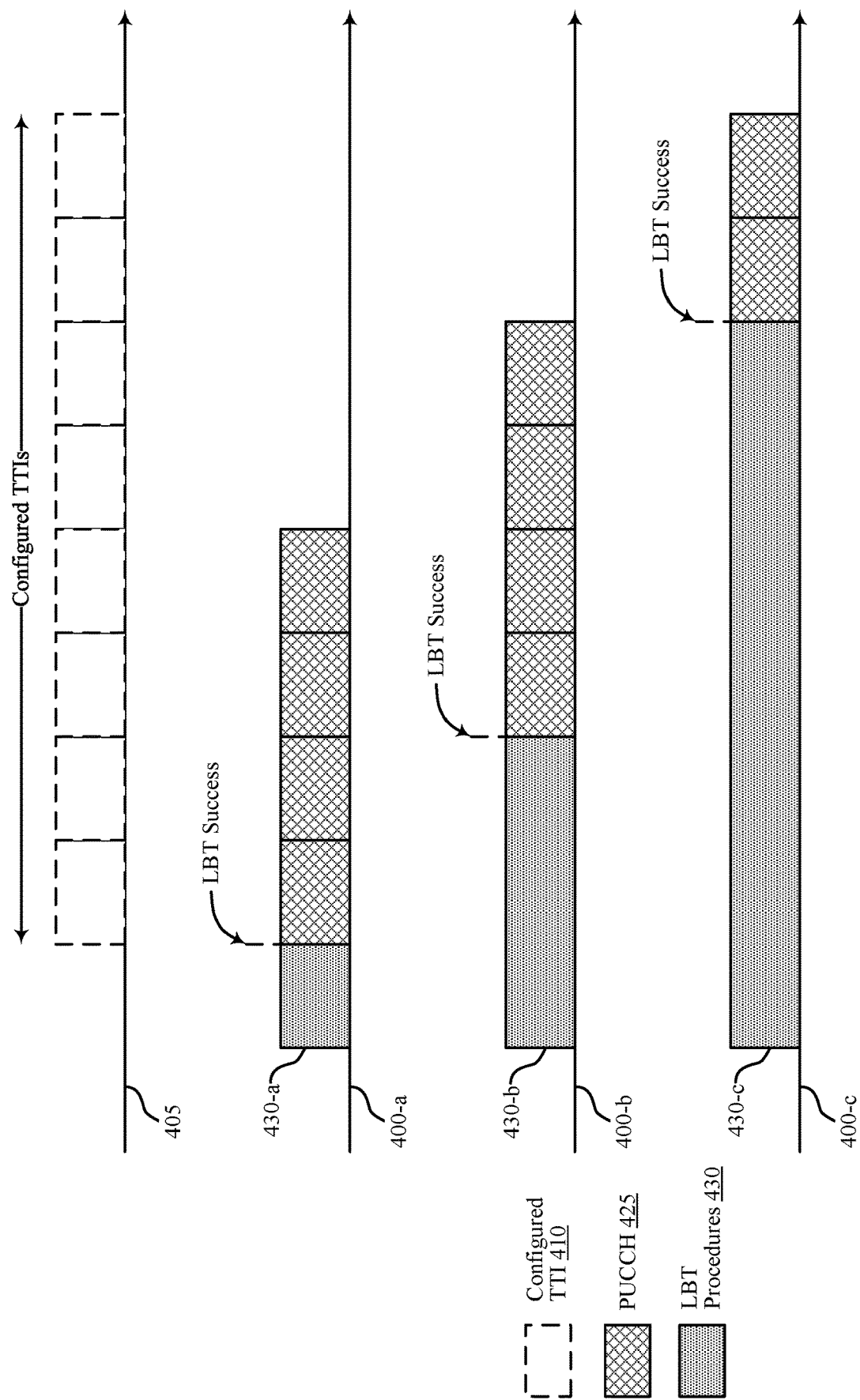
FIG. 4 illustrates example transmission timelines that support configuring uplink control channel resources for communications in a shared radio frequency spectrum in accordance with aspects of the present disclosure.

FIG. 4 illustrates example transmission timelines 400 that support configuring uplink control channel resources for communications in a shared radio frequency spectrum in accordance with aspects of the present disclosure. The transmission timelines 400 illustrate transmission schemes and frame structure designs for communications in a wireless communications system operating in the shared radio frequency spectrum, which may implement aspects of the wireless communications system 100 as described with reference to FIG. 1 and the transmission timelines described with reference to FIGS. 2A, 2B, and 3. The transmission timelines 400 show example communications between a base station and a UE, which may be examples of the corresponding devices as described with reference to FIGS. 1 through 3. The transmission timelines 400 illustrate example transmission schemes in which the UE transmits to the base station multiple repetitions of uplink control information (e.g., multiple PUCCH retransmissions) up to a maximum number of repetitions.

FIG. 4 shows three transmission timelines 400, including a first transmission timeline 400-*a*, a second transmission timeline 400-*b*, and a third transmission timeline 400-*c*. Each of the transmission timelines 400 shows communications at the UE aligned with a configuration timeline 405. The configuration timeline 405 shows eight configured TTIs 410 (e.g., slots, PUCCH slots, subframes, symbols, etc.), as may be configured by the base station according to a resource allocation. It is to be understood that the illustration of eight configured TTIs 410 is only an example resource allocation, and a resource allocation may contain any number of contiguous or non-contiguous configured TTIs 410.

As similarly described herein, the base station may access a channel (i.e., configured time-frequency resources) of a shared radio frequency spectrum, for example, following a successful channel access procedure (e.g., an LBT procedure). The base station may then transmit downlink information to the UE using the channel. In some cases, the downlink information may include an indication (e.g., via one or more indicator bits in a resource configuration) of the resource allocation. The resource allocation may include, for example, an allocation of time, frequency, and/or spatial resources for subsequent uplink and downlink communications between the base station and the UE, including, for example, time-frequency resources defining the configured TTIs 410 during which the UE may transmit repetitions of uplink control information (e.g., via a PUCCH 425).

In some cases, the resource configuration may indicate to the UE a spatial relationship for one or more transmit beams to be used for transmitting the one or more repetitions of the PUCCH 425, in which case the UE may transmit the PUCCH 425 using the correspondingly configured transmit beam or beams. The resource allocation may further, in some cases, include a first parameter N indicating that N resources (e.g., time resources defining the configured TTIs 410) are to be allocated for N TTIs for repetitions of the PUCCH 425 and a second parameter M indicating a maximum number M repetitions of the PUCCH 425. In the example of FIG. 4, as the resource allocation includes resources allocated for eight configured TTIs 410, the first parameter N is set to 8 (i.e., there are eight configured TTIs 410), and the second parameter M may be set to 4 for each of the transmission timelines 400 (i.e., corresponding to a maximum of four repetitions of the PUCCH 425).

In some cases, as similarly described herein, the UE may perform one or more channel access procedures (e.g., LBT procedures 430) to determine whether the channel is available. The UE may, for example, perform an LBT procedure 430 before transmitting a first PUCCH 425 of a sequence of one or more contiguous (i.e., consecutive) repetitions of the PUCCH 425. Following a successful LBT procedure 430-a, the UE may transmit one or more repetitions of the uplink control information in subsequent repeated transmissions of the PUCCH 425 using the N configured TTIs 410 corresponding to the time, frequency, and/or spatial resources signaled to the UE from the base station in the resource configuration. That is, the UE may transmit to the base station, according to the first parameter N, N repetitions (i.e., N instances) of the PUCCH 425 (including the uplink control information) in each of the configured TTIs 410 corresponding to the resources allocated by the base station. The UE may continue to transmit repetitions of the PUCCH 425 according to the configured TTIs 410, for example, until the UE transmits a number of repetitions of the PUCCH equal to M (i.e., a maximum number of repeated instances including the same uplink control information).

For example, as shown by the transmission timeline 400-a, the UE may successfully perform the LBT procedure 430-a before a first configured TTI 410. Following the successful LBT procedure 430-a, the UE may transmit repetitions of the PUCCH 425 using the configured TTIs 410 (e.g., consecutively, as shown in FIG. 4). Because M is configured as 4 in the example of the first transmission timeline 400-a, the UE may stop transmitting repetitions of the PUCCH 425 after transmitting a fourth repetition of the PUCCH 425, thus truncating any further repetitions of the PUCCH 425.

In a second example, as shown by the transmission timeline 400-b, the UE may obtain a successful result for the LBT procedure 430-b at a third configured TTI 410. Following the successful LBT procedure 430-b, the UE may transmit repetitions of the PUCCH 425 using the configured TTIs 410. Because M is configured as 4 in the example of the second transmission timeline 400-b, the UE may stop transmitting repetitions of the PUCCH 425 after transmitting a fourth repetition of the PUCCH 425 (as shown in FIG. 4, in a sixth configured TTI 410).

In a third example, as shown by the transmission timeline 400-b, the UE may obtain a successful result for the LBT procedure 430-b at a seventh configured TTI 410. Following the successful LBT procedure 430-c, the UE may transmit repetitions of the PUCCH 425 using the configured TTIs 410. In the example of the second transmission timeline 400-c, M is configured as 4. The UE may stop transmitting repetitions of the PUCCH 425 after transmitting only two repetitions of the PUCCH 425, as, in the example of the second transmission timeline 400-c, the UE has used each of the eight configured TTIs 410, according to the value of N as 8.

As similarly described herein, the base station may receive and combine the PUCCH 425 repetitions, which may facilitate relatively improved performance for communications between the UE and the base station. In some cases, the UE may include additional information in one or more of the transmissions of the PUCCH 425, for example, to indicate a sequence, ordering, or finalization of the transmissions of the PUCCH 425. For example, a scrambling sequence for a demodulation reference signal (DMRS) for the transmissions of the PUCCH 425 may depend on an index (e.g., a repetition index) associated with each of the transmissions of the PUCCH 425 (e.g., the sequence (1, . . . , M)). Additionally or alternatively, one or more of the transmissions of the PUCCH 425 (e.g., the last transmission of the PUCCH 425, each of the transmissions of the PUCCH 425, etc.) may include one or more bits (e.g., an Mth, or last, transmission) indicating the repetition index, and the remaining repetitions of the PUCCH 425 may not include these bits. If the base station receives and identifies the presence of the repetition index bits (e.g., the Mth, or last, transmission), the base station may stop monitoring for further repetitions of the PUCCH, and/or the base station may then expect to receive further information from the UE (e.g., data in a physical uplink shared channel (PUSCH), as further described herein). Further additionally or alternatively, the base station may reassign the remaining resources originally allocated to the configured TTIs 410, for example, to other downlink channels, to other uplink channels, and/or for communications with other UEs.

Figure 5:
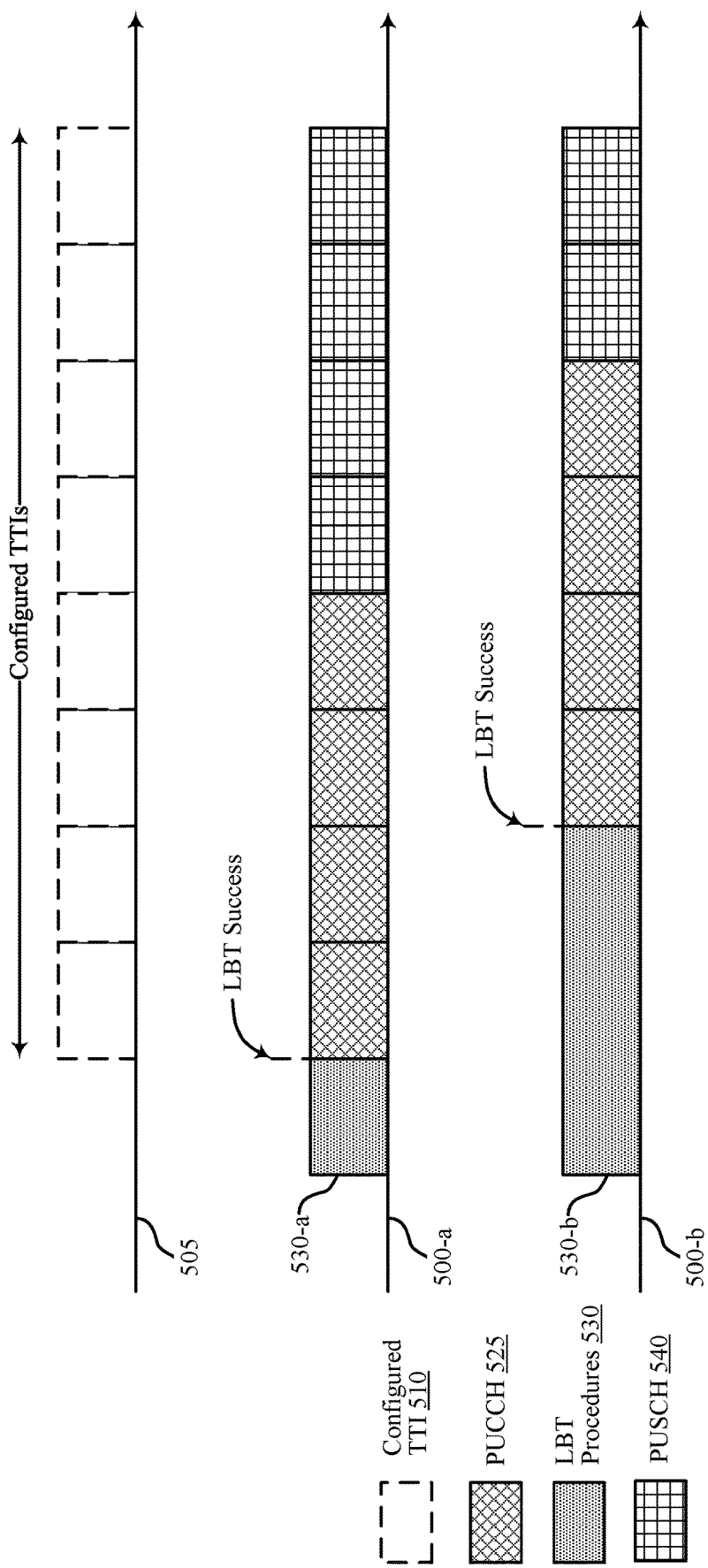
FIG. 5 illustrates example transmission timelines that support configuring uplink control channel resources for communications in a shared radio frequency spectrum in accordance with aspects of the present disclosure.

FIG. 5 illustrates example transmission timelines 500 that support configuring uplink control channel resources for communications in a shared radio frequency spectrum in accordance with aspects of the present disclosure. The transmission timelines 500 illustrate transmission schemes and frame structure designs for communications in a wireless communications system operating in the shared radio frequency spectrum, which may implement aspects of the wireless communications system 100 as described with reference to FIG. 1 and the transmission timelines described with reference to FIGS. 2A through 4. The transmission timelines 500 show example communications between a base station and a UE, which may be examples of the corresponding devices as described with reference to FIGS. 1 through 4. The transmission timelines 500 illustrate example transmission schemes in which the UE transmits to the base station multiple repetitions of uplink control information (e.g., multiple PUCCH retransmissions) multiplexed with transmissions using other channels.

FIG. 5 shows two transmission timelines 500, including a first transmission timeline 500-a and a second transmission timeline 500-b. Each of the transmission timelines 500 shows communications at the UE aligned with a configuration timeline 505. The configuration timeline 505 shows eight configured TTIs 510 (e.g., slots, PUCCH slots, subframes, symbols, etc.), as may be configured by the base station according to a resource allocation. It is to be understood that the illustration of eight configured TTIs 510 is only an example resource allocation, and a resource allocation may contain any number of contiguous or non-contiguous configured TTIs 510.

As similarly described herein, the base station may access a channel (i.e., configured time-frequency resources) of a shared radio frequency spectrum, for example, following a successful channel access procedure (e.g., an LBT procedure). The base station may then transmit downlink information to the UE using the channel. In some cases, the downlink information may include an indication (e.g., via one or more indicator bits in a resource configuration) of the resource allocation. The resource allocation may include, for example, an allocation of time, frequency, and/or spatial resources for subsequent uplink and downlink communications between the base station and the UE, including, for example, time-frequency resources defining the configured TTIs 510 during which the UE may transmit repetitions of uplink control information (e.g., via a PUCCH 525).

In some cases, the resource configuration may indicate to the UE a spatial relationship for one or more transmit beams to be used for transmitting the one or more repetitions of the PUCCH 525, in which case the UE may transmit the PUCCH 525 using the correspondingly configured transmit beam or beams. The resource allocation may further, in some cases, include a first parameter N indicating that N resources (e.g., time resources defining the configured TTIs 510) are to be allocated for N TTIs for repetitions of the PUCCH 525 and a second parameter M indicating a maximum number M repetitions of the PUCCH 525. In the example of FIG. 5, as the resource allocation includes resources allocated for eight configured TTIs 510, the first parameter N is set to 8 (i.e., there are eight configured TTIs 510), and the second parameter M may be set to 4 (i.e., corresponding to a maximum of four repetitions of the PUCCH 525).

In some cases, as similarly described herein, the UE may perform one or more channel access procedures (e.g., LBT procedures 530) to determine whether the channel is available. The UE may, for example, perform an LBT procedure 530 before transmitting a first PUCCH 525 of a sequence of one or more contiguous (i.e., consecutive) repetitions of the PUCCH 525. Following a successful LBT procedure 530-a, the UE may transmit one or more repetitions of the uplink control information in subsequent repeated transmissions of the PUCCH 525 using the N configured TTIs 510 corresponding to the time, frequency, and/or spatial resources signaled to the UE from the base station in the resource configuration. That is, the UE may transmit to the base station, according to the first parameter N, N repetitions (i.e., N instances) of the PUCCH 525 (including the uplink control information) in each of the configured TTIs 510 corresponding to the resources allocated by the base station. The UE may continue to transmit repetitions of the PUCCH 525 according to the configured TTIs 510, for example, until the UE transmits a number of repetitions of the PUCCH equal to M (i.e., a maximum number of repeated instances including the same uplink control information).

In some cases, if there are further allocated resources (e.g., further remaining configured TTIs 510), the UE may use these resources for other uplink transmissions, such as reference signals (e.g., a sounding reference signal (SRS)); transmissions using other channels, such as uplink data transmissions (e.g., via a PUSCH 540); and/or random access transmissions (e.g., requests for resource allocations, or other transmissions via a physical random access channel (PRACH)). These additional uplink transmissions may be conditioned on, for example, the UE transmitting the maximum number M repetitions of the PUCCH 525. For example, the UE may receive a grant before transmitting (e.g., a "floating" PUSCH grant). The grant may trigger the UE to transmit one or more uplink transmissions upon an occurrence of an event, that is, a condition being satisfied (e.g., M repetitions of the PUCCH 525). In some cases, the UE may perform one or more additional channel access procedures (e.g., additional LBT procedures 530) to gain access to additional time, frequency, and/or spatial (e.g., beam) resources to transmit the additional uplink transmissions. For example, if the base station detects the completion of the UE transmitting M transmissions of the PUCCH, the base station may expect (e.g., according to a configuration) to receive the PUSCH 540 in the subsequent configured TTIs 510 of each of the N configured TTIs 510. In some cases, the UE may not perform an additional LBT procedure 530 if, for example, the UE transmits further communications using the same resources as were originally allocated for the configured TTIs 510.

In a first example, as shown by the transmission timeline 500-a, the UE may successfully perform the LBT procedure 530-a before a first configured TTI 510. Following the successful LBT procedure 530-a, the UE may transmit repetitions of the PUCCH 525 using the configured TTIs 510 (e.g., consecutively, as shown in FIG. 5). Because M is configured as 4 in the example of the first transmission timeline 500-a, the UE may stop transmitting repetitions of the PUCCH 525 after transmitting a fourth repetition of the PUCCH 525. The UE may then transmit uplink data using the PUSCH 540, for example, using the remaining resources that had been allocated for the repetitions of the PUCCH 525. That is, the UE may transmit uplink data using the PUSCH 540 using the resources of the four remaining configured TTIs 510 (i.e., the fifth through eighth configured TTIs 510, in this example in which N is set to 8).

In a second example, as shown by the transmission timeline 500-b, the UE may obtain a successful result for the LBT procedure 530-b at a third configured TTI 510. Following the successful LBT procedure 530-b, the UE may transmit repetitions of the PUCCH 525 using the configured TTIs 510. Because M is configured as 4 in the example of the second transmission timeline 500-b, the UE may stop transmitting repetitions of the PUCCH 525 after transmitting a fourth repetition of the PUCCH 525 (as shown in FIG. 5, in a sixth configured TTI 510). The UE may then transmit uplink data using the PUSCH 540, for example, using the remaining resources that had been allocated for the repetitions of the PUCCH 525. That is, the UE may transmit uplink data using the PUSCH 540 using the resources of the two remaining configured TTIs 510 (i.e., the seventh and eighth configured TTIs 510, in this example in which N is set to 8).

Figure 6:
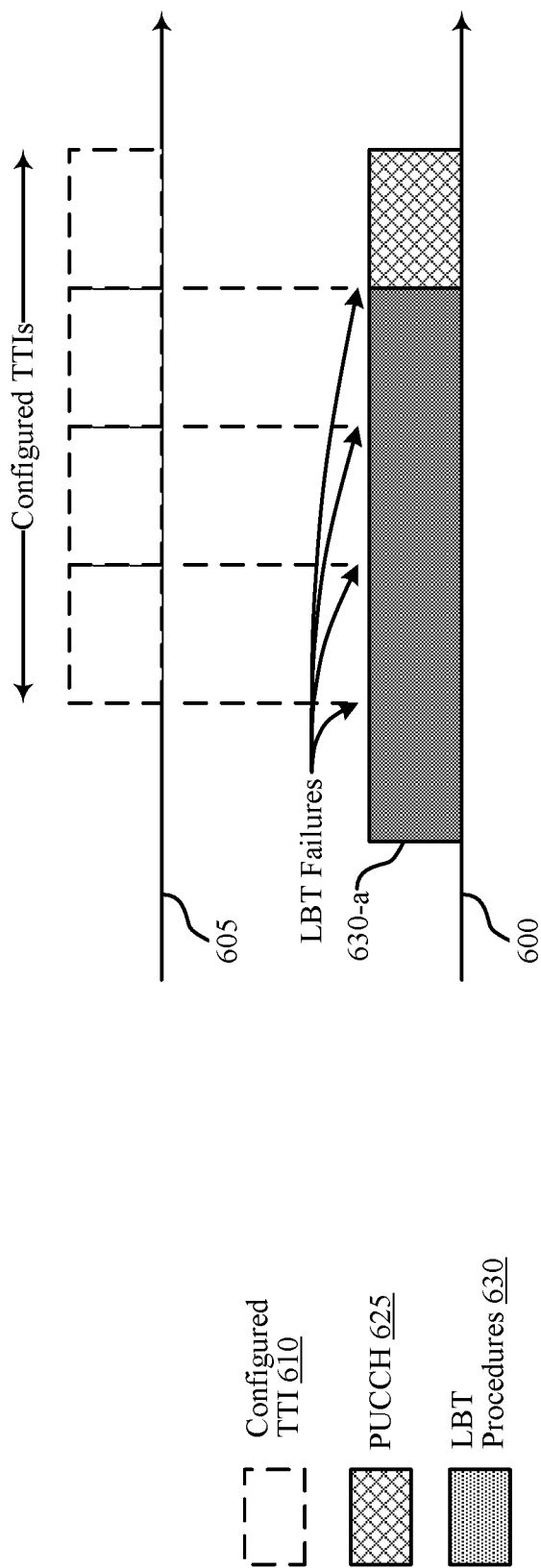
FIG. 6 illustrates example an transmission timeline that support configuring uplink control channel resources for communications in a shared radio frequency spectrum in accordance with aspects of the present disclosure.

FIG. 6 illustrates an example transmission timeline 600 that support configuring uplink control channel resources for communications in a shared radio frequency spectrum in accordance with aspects of the present disclosure. The transmission timeline 600 illustrates a transmission scheme and frame structure design for communications in a wireless communications system operating in the shared radio frequency spectrum, which may implement aspects of the wireless communications system 100 as described with reference to FIG. 1 and the transmission timelines described with reference to FIGS. 2A through 5. The transmission timeline 600 shows example communications between a base station and a UE, which may be examples of the corresponding devices as described with reference to FIGS. 1 through 5. The transmission timeline 600 illustrates an example transmission scheme in which the UE may fail to adequately gain access to a channel for the UE to transmit uplink control information to the base station.

FIG. 6 shows a transmission timeline 600 in which communications at the UE are aligned with a configuration timeline 605. The configuration timeline 605 shows four configured TTIs 610 (e.g., slots, PUCCH slots, subframes, symbols, etc.), as may be configured by the base station according to a resource allocation. It is to be understood that the illustration of four configured TTIs 610 is only an example resource allocation, and a resource allocation may contain any number of contiguous or non-contiguous configured TTIs 610.

As similarly described herein, the base station may access a channel (i.e., configured time-frequency resources) of a shared radio frequency spectrum, for example, following a successful channel access procedure (e.g., an LBT procedure). The base station may then transmit downlink information to the UE using the channel. In some cases, the downlink information may include an indication (e.g., via one or more indicator bits in a resource configuration) of the resource allocation. The resource allocation may include, for example, an allocation of time, frequency, and/or spatial resources for subsequent uplink and downlink communications between the base station and the UE, including, for example, time-frequency resources defining the configured TTIs 610 during which the UE may transmit repetitions of uplink control information (e.g., via a PUCCH 625).

In some cases, the resource configuration may indicate to the UE a spatial relationship for one or more transmit beams to be used for transmitting the one or more repetitions of the PUCCH 625, in which case the UE may transmit the PUCCH 625 using the correspondingly configured transmit beam or beams. The resource allocation may further, in some cases, include a first parameter N indicating that N resources (e.g., time resources defining the configured TTIs 610) are to be allocated for N TTIs for repetitions of the PUCCH 625 and a second parameter M indicating a maximum number M repetitions of the PUCCH 625. In the example of FIG. 6, as the resource allocation includes resources allocated for eight configured TTIs 610, the first parameter N is set to 8 (i.e., there are eight configured TTIs 610), and the second parameter M may be set to 4 (i.e., corresponding to a maximum of four repetitions of the PUCCH 625).

In some cases, as similarly described herein, the UE may perform one or more channel access procedures (e.g., LBT procedures 630) to determine whether the channel is available. The UE may, for example, perform an LBT procedure 630 before transmitting a first PUCCH 625 of a sequence of one or more contiguous (i.e., consecutive) repetitions of the PUCCH 625. Following a successful LBT procedure 630-a, the UE may transmit one or more repetitions of the uplink control information in subsequent repeated transmissions of the PUCCH 625 using the N configured TTIs 610 corresponding to the time, frequency, and/or spatial resources signaled to the UE from the base station in the resource configuration. That is, the UE may transmit to the base station, according to the first parameter N, N repetitions (i.e., N instances) of the PUCCH 625 (including the uplink control information) in each of the configured TTIs 610 corresponding to the resources allocated by the base station. The UE may continue to transmit repetitions of the PUCCH 625 according to the configured TTIs 610, for example, until the UE transmits a number of repetitions of the PUCCH equal to N (i.e., at the last configured TTI 610) or M (i.e., a maximum number of repeated instances including the same uplink control information).

In some cases, the UE may transmit the PUCCH 625 without having successfully completed the LBT procedure 630-a to access the channel (i.e., a contention exempted PUCCH transmission). For example, the UE may be configured with a threshold number for a minimum number of transmission the PUCCH 625 to be transmitted during a transmission opportunity (i.e., establishing a "required" number of transmissions of the PUCCH 625 in the transmission opportunity). Similarly, in some cases, the UE may transmit a number (e.g., defined by a third parameter K) of repetitions of the PUCCH 625 without having successfully completed the LBT procedure. For example, according to the parameter K, and with N configured TTIs 610, the threshold number for the minimum number of transmission of the PUCCH 625 may be satisfied if the UE fails the LBT procedure 630a number N–K times (e.g., the first N–K configured TTIs 610). In some cases, transmissions of the PUCCH 625 may be made up of a number of symbols (e.g., 1 or 2 symbols) and/or a priority associated with the PUCCH 625 may be a high priority. In such cases, the UE may transmit the PUCCH 625 using, for example, a last number of one or more configured TTIs 610 of a transmission opportunity to attempt to communicate the associated uplink control information to the base station, even though the UE may not have obtained a successful result for an LBT procedure using each of the previous configured TTIs 610.

In an example, as shown by the transmission timeline 600, the UE may perform the LBT procedure 630-a starting before a first configured TTI 610. According to the example transmission timeline 600, the UE may not obtain a successful result for the LBT procedure 630a while performing the LBT procedure 630-a over each of the first three configured TTIs 610 of the four total configured TTIs 610. In this example, the UE would not have a further chance to successfully acquire a transmission opportunity within these four configured TTIs 610. That is, even if the UE used the fourth (i.e., final) configured TTI 610 to continue the LBT procedure 630-a, and the UE then obtained a successful result for the LBT procedure 630-a, none of the allocated resource of the configured TTIs 610 would be remaining for the UE to use to transmit the PUCCH 625. Thus, in this case, despite having failed the LBT procedure 630-a, the UE may transmit the PUCCH 625 using a final occasion of the potential transmission opportunity (i.e., an Nth of the N configured TTIs 610), here the fourth configured TTI 610.

Following the successful LBT procedure 630-a, the UE may transmit repetitions of the PUCCH 625 using the configured TTIs 610 (e.g., consecutively, as shown in FIG.

6). Because M is configured as 4 in the example of the first transmission timeline 600, the UE may stop transmitting repetitions of the PUCCH 625 after transmitting a fourth repetition of the PUCCH 625. The UE may then transmit uplink data using the PUSCH 640, for example, using the remaining resources that had been allocated for the repetitions of the PUCCH 625. That is, the UE may transmit uplink data using the PUSCH 640 using the resources of the four remaining configured TTIs 610 (i.e., the fifth through eighth configured TTIs 610, in this example in which N is set to 8).

In some cases, the base station may detect that the UE has failed to fulfill (or exceed) a threshold number of repetitions of transmissions of the PUCCH 625. The base station may set the threshold number of repetitions of transmissions according to the parameter M or according to a further configured parameter. In some such cases, the base station may transmit a second resource configuration to the UE (e.g., via an updated resource configuration, or, alternatively, another form of signaling that provides a configuration to the UE). The updated resource configuration may include an indication (e.g., via one or more indicator bits) of an updated value for the first parameter N indicating the N resources to be allocated for the configured TTIs 610 in which the UE may transmit repetitions of the PUCCH 625. In cases in which the base station has determined that the UE has failed to satisfy a threshold number of repetitions of transmissions of the PUCCH 625, the base station may signal to the UE a greater value for the parameter N, such that the UE is allocated a greater number of resources for the UE to transmit repetitions of the PUCCH 625. In these cases, the UE may accordingly have a greater number of opportunities (i.e., N opportunities) by way of a greater number of configured TTIs 610 during which the UE may attempt to successfully contend for access to the channel and meet the threshold number of repetitions of transmissions of the PUCCH 625.

Additionally or alternatively, the base station may identify that the UE relatively frequently (e.g., as compared to a configured frequency threshold, and the UE exceeding the frequency threshold) transmits contention exempted PUCCH transmission to the base station, as described herein. For example, the base station may detect that the base station relatively frequently receives the PUCCH 625 from the UE during the final configured TTI 610 of the resources allocated for the UE's transmissions. In such cases, the base station may similarly transmit a second resource configuration to the UE to indicate to the UE an updated value for the first parameter N. In these cases, the UE may accordingly have a greater length of time to gain access to the channel via the LBT procedure to transmit multiple repetitions of the PUCCH 625 to the base station.

In some cases, the base station may transmit a further resource configuration (e.g., a further updated resource configuration) to the UE to decrease the number of configured TTIs 610 allocated for the UE to transmit. This updated resource configuration may include an indication (e.g., via one or more indicator bits) of an updated value for the first parameter N indicating the N resources to be allocated for the configured TTIs 610 in which the UE may transmit repetitions of the PUCCH 625. For example, the base station may signal to the UE a lesser value for the parameter N, such that the UE is allocated a lesser number of resources for the UE to transmit repetitions of the PUCCH 625. In these cases, the UE may accordingly have fewer opportunities during which to contend for access to the channel and to meet the threshold number of repetitions of transmissions of the PUCCH 625. The base station may signal such a decreased resource allocation to the UE, for example, to conserve the frequency, time, and/or spatial resources such that these resources may be allocated to other channels and/or for communications with other devices. Additionally or alternatively, the base station may signal such a decreased resource allocation to the UE, for example, to conserve power at the UE by reducing a number of attempted transmissions.

Figure 7:
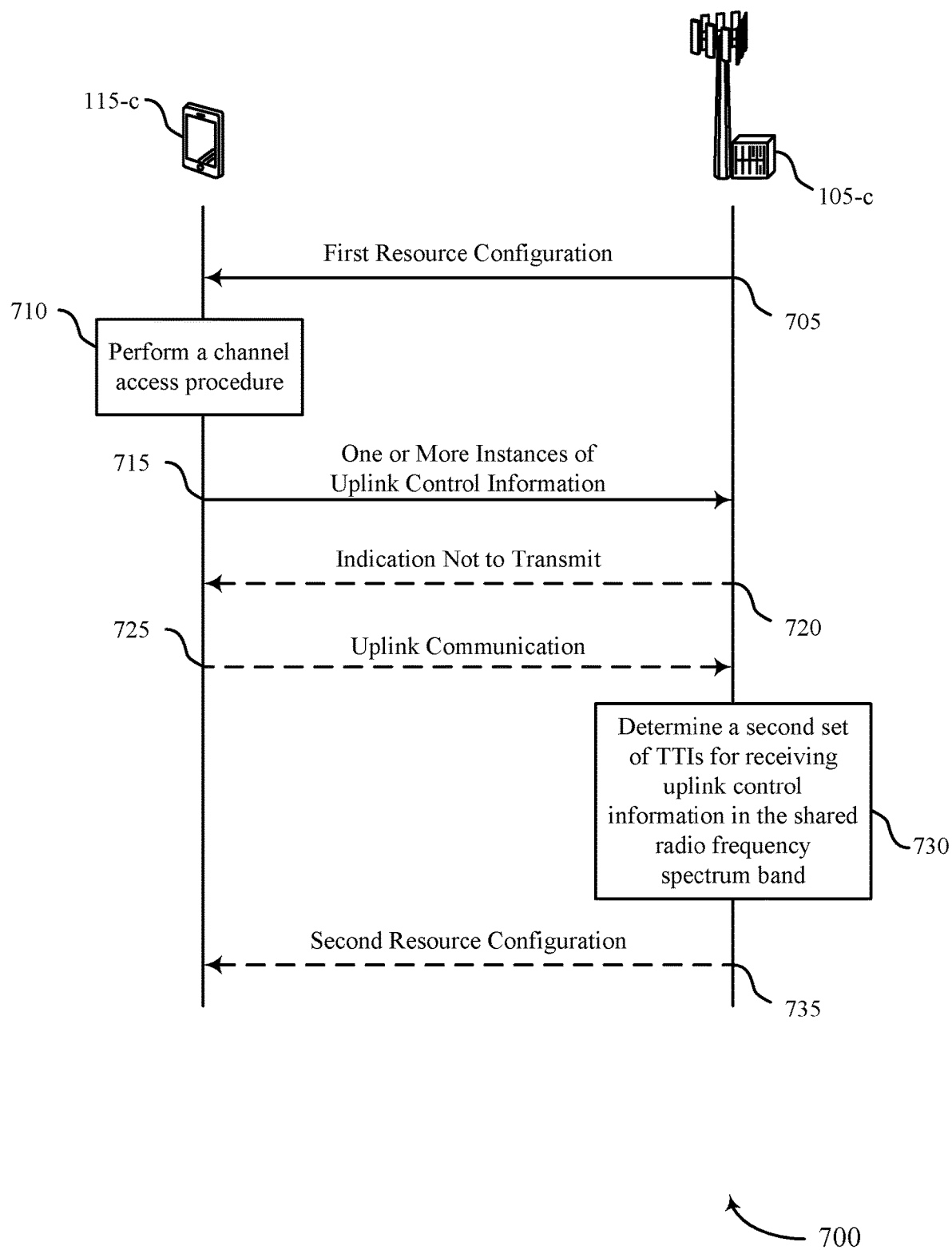
FIG. 7 illustrates an example of a process flow that supports configuring uplink control channel resources for communications in a shared radio frequency spectrum in accordance with aspects of the present disclosure.

FIG. 7 illustrates an example of a process flow 700 that supports configuring uplink control channel resources for communications in a shared radio frequency spectrum in accordance with aspects of the present disclosure. In some examples, the process flow 700 may implement aspects of the wireless communications system 100, as described with reference to FIG. 1 and the transmission timelines described with reference to FIGS. 2A through 6. The process flow 700 shows an example of communications between a base station 105-c and a UE 115-c, which may be examples of the corresponding devices as described with reference to FIGS. 1 through 6.

At 705, the base station 105-c may transmit to the UE 115-c, and the UE 115-c may receive from the base station 105-c, a first resource configuration. The resource configuration may include a first parameter (e.g., the parameter N, as described with reference to FIGS. 3 through 6) indicating a set of TTIs for transmitting uplink control information (e.g., a PUCCH) in a shared radio frequency spectrum band. The resource configuration may indicate time-frequency resources for each of the set of TTIs for transmitting uplink control information. In some cases, the resource configuration may indicate a spatial relationship for one or more transmit beams to be used for transmitting one or more instances of the uplink control information. In some cases, the resource configuration may also include a second parameter (e.g., the parameter M, as described with reference to FIGS. 3 through 6) indicating a maximum number of instances for the uplink control information to be transmitted.

At 710, the UE 115-c may perform a channel access procedure (e.g., an LBT procedure) to obtain access to the shared radio frequency spectrum band.

At 715, the UE 115-c may transmit to the base station 105-c, and the UE 115-c may receive from the base station 105-c, one or more instances of the uplink control information in one or more TTIs of the set of TTIs, where a number of the one or more instances is based on a conclusion of the channel access procedure and a number of TTIs in the set of TTIs. In some cases, the number of the one or more instances may be less than or equal to the maximum number of instances, for example, indicated via the parameter M. In some cases, the one or more instances of the uplink control information may include one or more indexes for corresponding ones of the TTIs. The one or more indexes may indicate, for example, a last instance of the repetitions of the uplink control information. In some cases, the number of TTIs for transmitting uplink control information may be contiguous in time, frequency, or both. Alternatively, the number of TTIs for transmitting uplink control information may not be contiguous in time, frequency, or both.

In some cases, the one or more TTIs may be subsequent to the conclusion of the channel access procedure at 710, and the number of the one or more instances is based on a number of the one or more TTIs that are subsequent to the conclusion of the channel access procedure. In some cases, the number of the one or more instances may be based on a failure of the channel access procedure to obtain access to the shared radio frequency spectrum band.

At 720, the base station 105-c may transmit to the UE 115-c, and the UE 115-c may receive from the base station 105-c, indication not to transmit one or more instances of the uplink control information during one or more TTIs based on transmitting at least one of the one or more instances of the uplink control information. That is, (e.g., if the base station 105-c successfully receives one or more transmissions of the control information before the last of the TTIs), the base station may transmit an indication to the UE to stop further repetition of the control information earlier than the UE may otherwise according to the parameters of M and N.

At 725, the UE 115-c may transmit to the base station 105-c, and the UE 115-c may receive from the base station 105-c, an uplink communication using one or more TTIs of the set of TTIs subsequent to the one or more TTIs used to transmit the maximum number of instances for the uplink control information. The uplink communication may include, for example, a PUSCH, data transmitted using a PRACH, and/or a reference signal (e.g., a DMRS).

At 730, the base station 105-c may determine a second set of TTIs for receiving uplink control information in the shared radio frequency spectrum band based on a number of instances of uplink control information that were received during the first set of TTIs. In some cases, the base station 105-c may determine the second set of TTIs for receiving uplink control information based on the number of instances of uplink control information that were received during the first set of TTIs exceeding a threshold number of instances (e.g., the parameter M), and a number of TTIs of the second set of TTIs may be greater than a number of TTIs of the first set of TTIs. Alternatively, the base station 105-c may determine the second set of TTIs for receiving uplink control information based on the number of instances of uplink control information that were received during the first set of TTIs not exceeding a threshold number of instances (e.g., the parameter M), and a number of TTIs of the second set of TTIs may be less than a number of TTIs of the first set of TTIs.

At 735, the base station 105-c may transmit to the UE 115-c, and the UE 115-c may receive from the base station 105-c, a second resource configuration. The second resource configuration may include new value for the first parameter (or, e.g., a third independent parameter) indicating a further set of TTIs for transmitting further uplink control information in the shared radio frequency spectrum band. The second resource configuration may indicate time-frequency resources for each of this set of TTIs for transmitting the uplink control information. For example, the second resource configuration may increase or decrease a number of TTIs for the UE 115-c to subsequently transmit uplink control information in a similarly manner as described above, for example, at 715.

Figure 8:
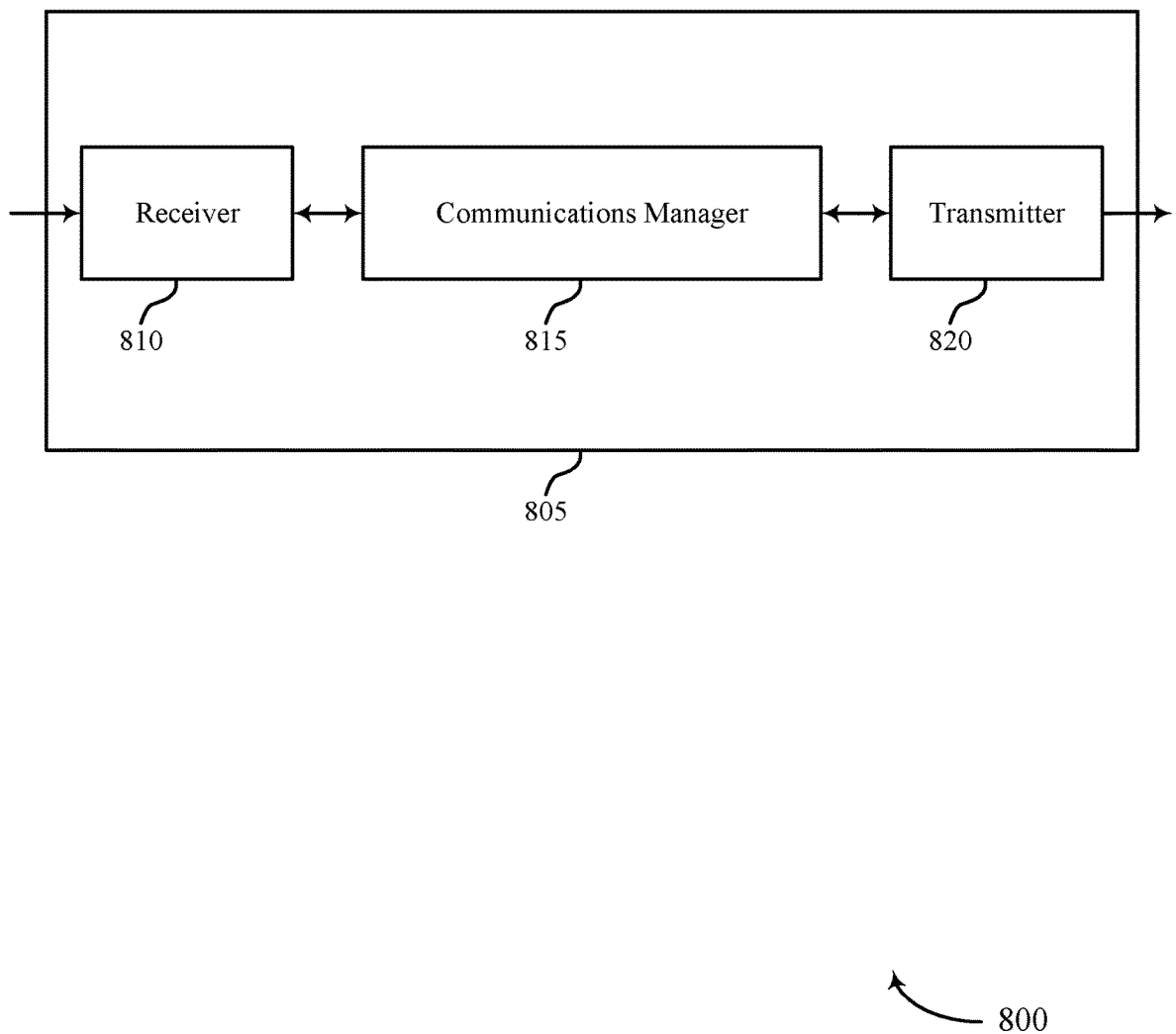
FIGS. 8 and 9 show block diagrams of devices that support configuring uplink control channel resources for communications in a shared radio frequency spectrum in accordance with aspects of the present disclosure.

FIG. 8 shows a block diagram 800 of a device 805 that supports configuring uplink control channel resources for communications in a shared radio frequency spectrum in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to configuring uplink control channel resources for communications in a shared radio frequency spectrum, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive, from a base station, a resource configuration, the resource configuration including a first parameter indicating a set of TTIs for transmitting uplink control information in a shared radio frequency spectrum band, perform a channel access procedure to obtain access to the shared radio frequency spectrum band, and transmit one or more instances of the uplink control information in one or more TTIs of the set of TTIs, where a number of the one or more instances is based on a conclusion of the channel access procedure and a number of TTIs in the set of TTIs. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 815 as described herein may be implemented to realize one or more potential advantages discussed herein. One implementation may allow the device 805 to transmit to a base station multiple repetitions of previously transmitted control channel information in correspondingly allocated TTIs. The base station may receive and combine these repetitions, which may provide relative performance improvements for communications between the device 805 and the base station. These repetitions may be combined at the base station, and may accordingly provide relative signal-to-interference-plus-noise ratio improvements.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
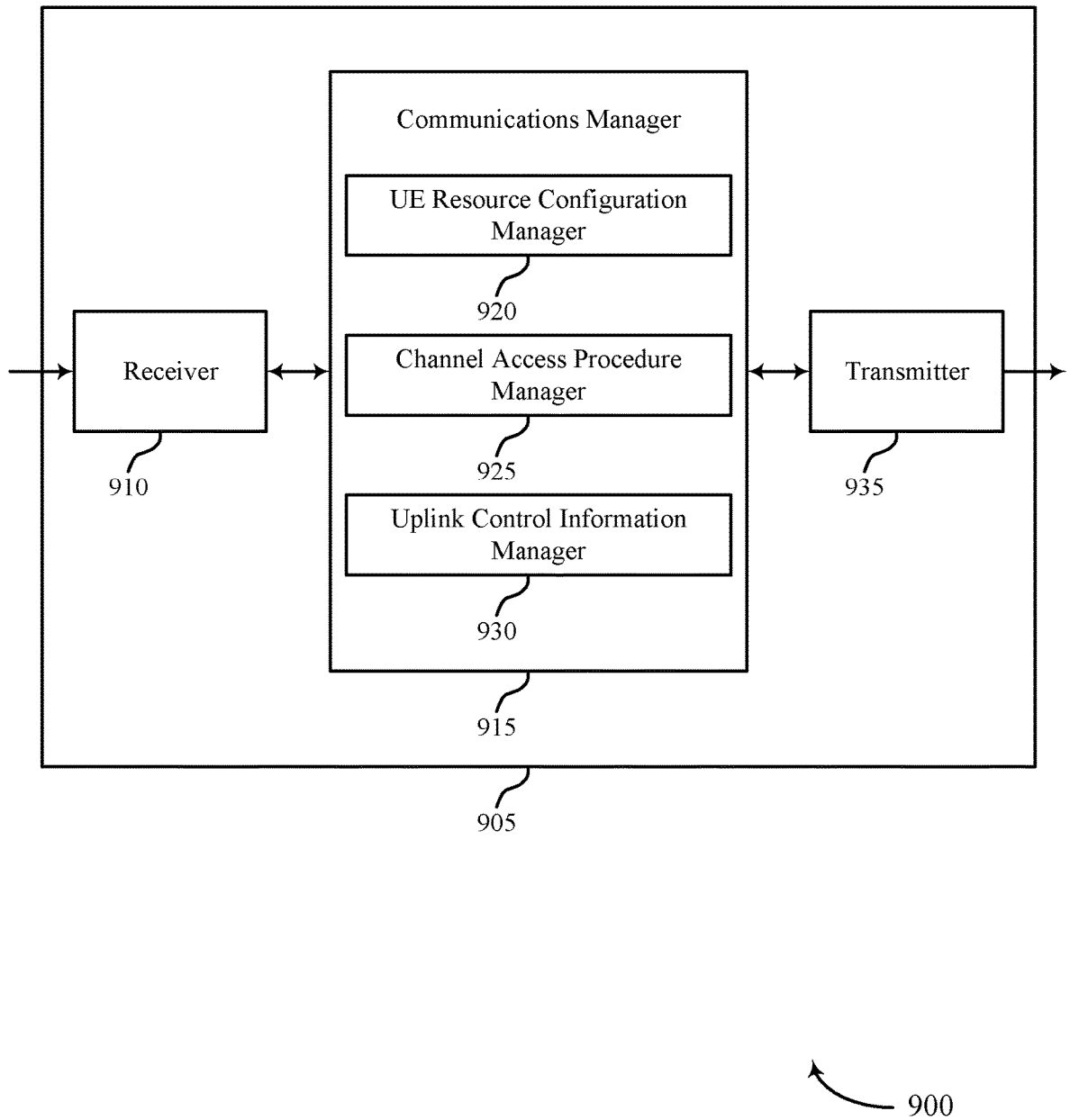

FIG. 9 shows a block diagram 900 of a device 905 that supports configuring uplink control channel resources for communications in a shared radio frequency spectrum in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to configuring uplink control channel resources for communications in a shared radio frequency spectrum, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a UE resource configuration manager 920, a channel access procedure manager 925, and an uplink control information manager 930. The communications manager 915 may be an example of aspects of the communications manager 1110 described herein.

The UE resource configuration manager 920 may receive, from a base station, a resource configuration, the resource configuration including a first parameter indicating a set of TTIs for transmitting uplink control information in a shared radio frequency spectrum band.

The channel access procedure manager 925 may perform a channel access procedure to obtain access to the shared radio frequency spectrum band.

The uplink control information manager 930 may transmit one or more instances of the uplink control information in one or more TTIs of the set of TTIs, where a number of the one or more instances is based on a conclusion of the channel access procedure and a number of TTIs in the set of TTIs.

In some implementations, the actions performed by the UE resource configuration manager 920, the channel access procedure manager 925, and the uplink control information manager 930, as described herein, may facilitate the processor 1140, as described with reference to FIG. 11, to more efficiently cause the device 905 to perform various functions. For example, the device 905 may transmit to a base station multiple repetitions of previously transmitted control channel information in correspondingly allocated TTIs. The base station may receive and combine these repetitions, which may provide relative performance improvements for communications between the device 905 and the base station. These repetitions may be combined at the base station, and may accordingly provide relative signal-to-interference-plus-noise ratio improvements. Further, in some cases, the base station may signal a new or updated resource allocation to the device 905. For example, the base station may decrease resources to be used for repetitions to conserve the frequency, time, and/or spatial resources such that these resources may be allocated to other channels and/or for communications with other device, which may reduce a number of processing operations at the processor and other components of the device 905. This may in turn provide power savings and conserve processing resources for the processor of the device 905.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
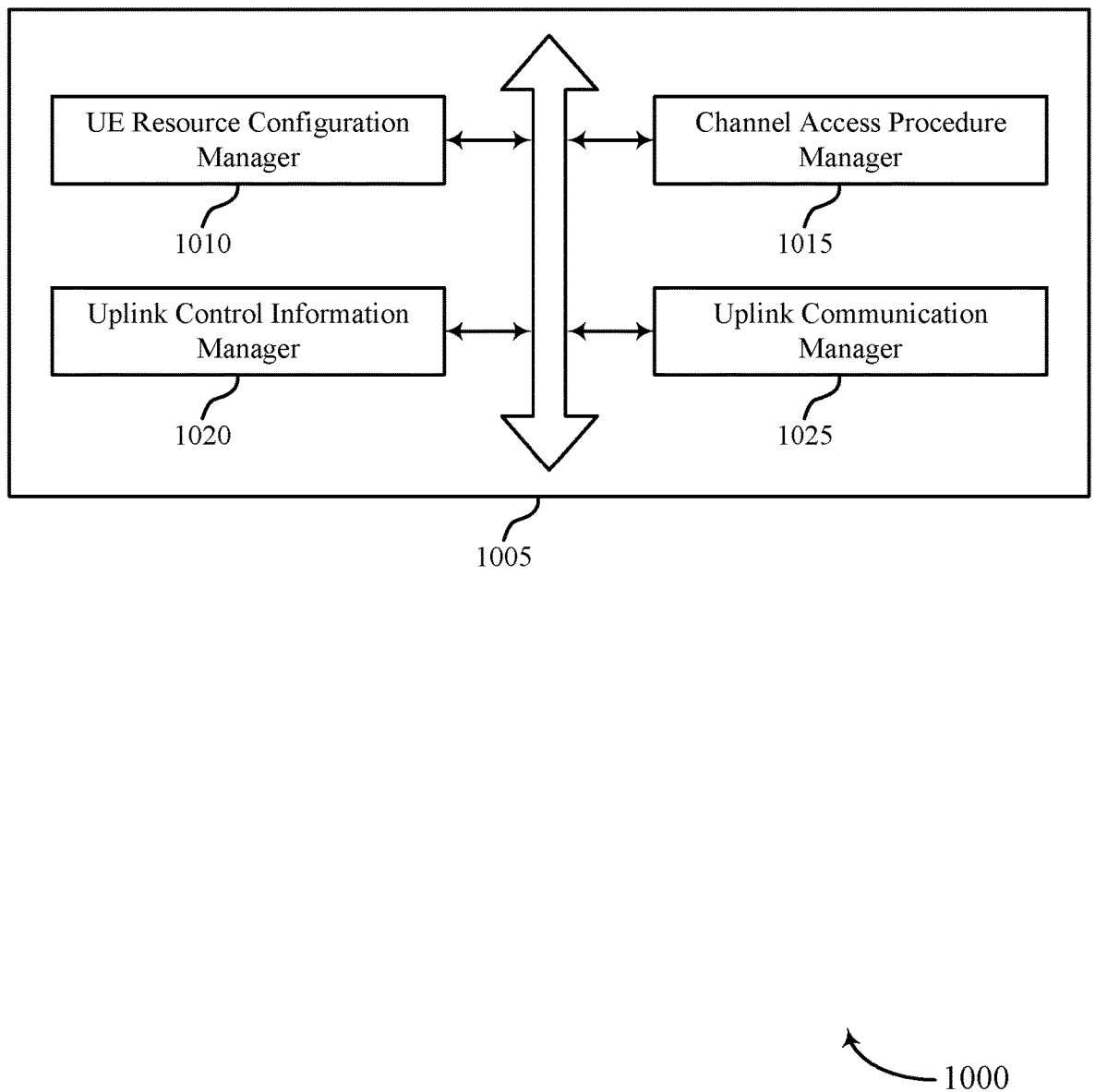
FIG. 10 shows a block diagram of a communications manager that supports configuring uplink control channel resources for communications in a shared radio frequency spectrum in accordance with aspects of the present disclosure.

FIG. 10 shows a block diagram 1000 of a communications manager 1005 that supports configuring uplink control channel resources for communications in a shared radio frequency spectrum in accordance with aspects of the present disclosure. The communications manager 1005 may be an example of aspects of a communications manager 815, a communications manager 915, or a communications manager 1110 described herein. The communications manager 1005 may include a UE resource configuration manager 1010, a channel access procedure manager 1015, an uplink control information manager 1020, and an uplink communication manager 1025. Each of these modules may communicate, directly or indirectly, with one another (e.g., via one or more buses).

The UE resource configuration manager 1010 may receive, from a base station, a resource configuration, the resource configuration including a first parameter indicating a set of TTIs for transmitting uplink control information in a shared radio frequency spectrum band. In some examples, the UE resource configuration manager 1010 may receive, in the resource configuration, a second parameter indicating a maximum number of instances for the uplink control information to be transmitted, where the one or more TTIs are subsequent to the conclusion of the channel access procedure, and the number of the one or more instances is less than or equal to the maximum number of instances. In some cases, the resource configuration indicates time-frequency resources for each of the set of TTIs for transmitting uplink control information. In some cases, the resource configuration indicates a spatial relationship for one or more transmit beams to be used for transmitting the one or more instances of the uplink control information.

The channel access procedure manager 1015 may perform a channel access procedure to obtain access to the shared radio frequency spectrum band. In some cases, the channel access procedure includes a listen-before-talk procedure. The uplink control information manager 1020 may transmit one or more instances of the uplink control information in one or more TTIs of the set of TTIs, where a number of the one or more instances is based on a conclusion of the channel access procedure and a number of TTIs in the set of TTIs. In some examples, the uplink control information manager 1020 may receive an indication not to transmit one or more instances of the uplink control information during one or more TTIs based on transmitting at least one of the one or more instances of the uplink control information.

In some examples, the uplink control information manager 1020 may transmit the one or more instances of the uplink control information using one or more TTIs of the set of TTIs that are subsequent to the conclusion of the channel access procedure, where the number of the one or more instances is based on a failure of the channel access procedure to obtain access to the shared radio frequency spectrum band.

In some cases, the transmitted one or more instances of the uplink control information include one or more indexes for corresponding ones of the TTIs. In some cases, the one or more indexes indicate a last instance of the uplink control information.

In some cases, the one or more TTIs are subsequent to the conclusion of the channel access procedure, and the number of the one or more instances is based on a number of the one or more TTIs that are subsequent to the conclusion of the channel access procedure. In some cases, the number of TTIs for transmitting uplink control information are contiguous in time, frequency, or both. In some cases, the number of TTIs for transmitting uplink control information are not contiguous in time, frequency, or both. In some cases, the uplink control information is transmitted using a physical uplink control channel.

The uplink communication manager 1025 may transmit an uplink communication using one or more TTIs of the set of TTIs subsequent to the one or more TTIs used to transmit the maximum number of instances for the uplink control information. In some cases, the uplink communication includes data transmitted using a physical uplink shared channel, data transmitted using a physical random access channel, a reference signal, or a combination thereof.

Figure 11:
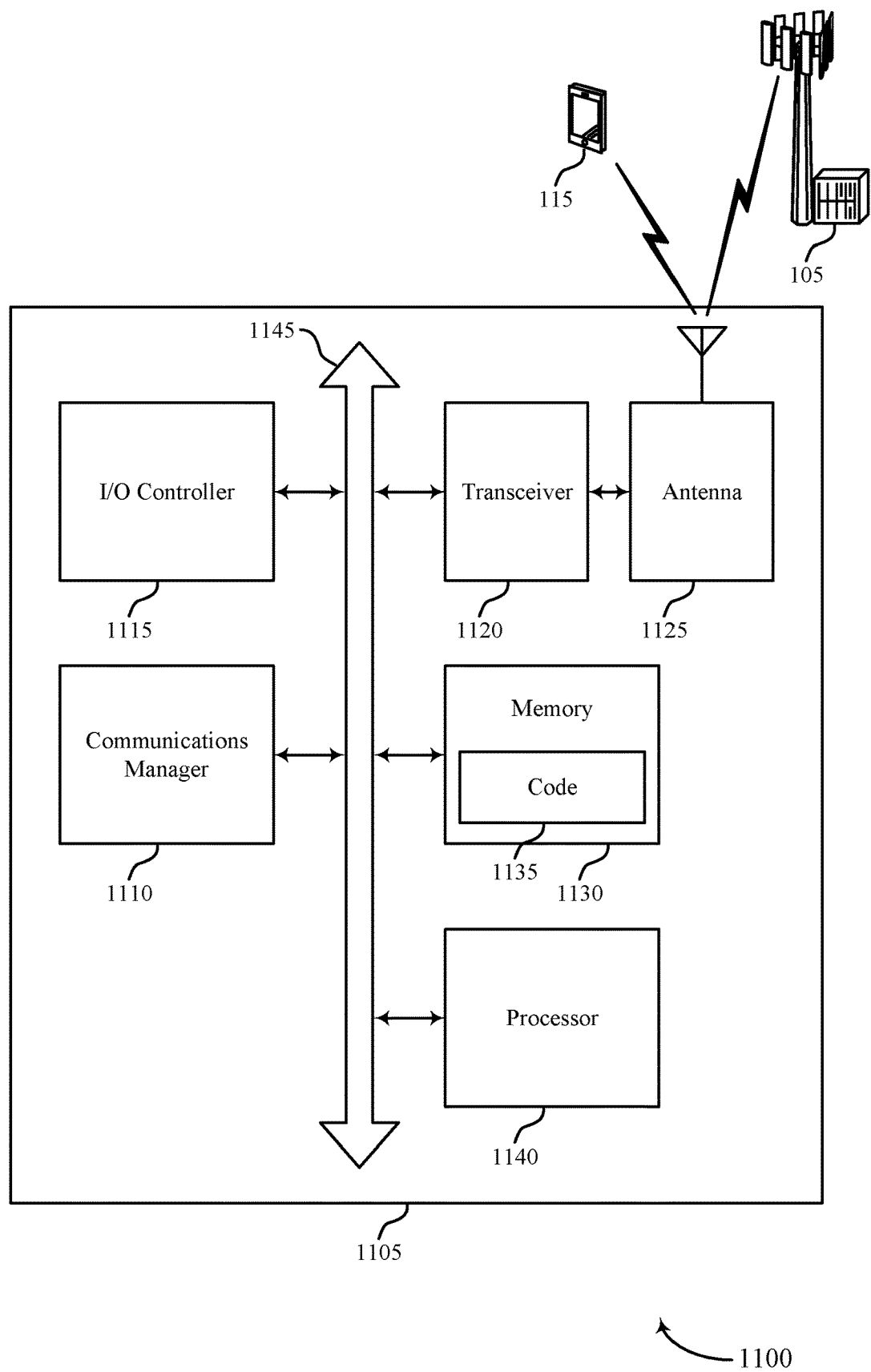
FIG. 11 shows a diagram of a system including a device that supports configuring uplink control channel resources for communications in a shared radio frequency spectrum in accordance with aspects of the present disclosure.

FIG. 11 shows a diagram of a system 1100 including a device 1105 that supports configuring uplink control channel resources for communications in a shared radio frequency spectrum in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive, from a base station, a resource configuration, the resource configuration including a first parameter indicating a set of TTIs for transmitting uplink control information in a shared radio frequency spectrum band, perform a channel access procedure to obtain access to the shared radio frequency spectrum band, and transmit one or more instances of the uplink control information in one or more TTIs of the set of TTIs, where a number of the one or more instances is based on a conclusion of the channel access procedure and a number of TTIs in the set of TTIs.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touch-screen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting configuring uplink control channel resources for communications in a shared radio frequency spectrum).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
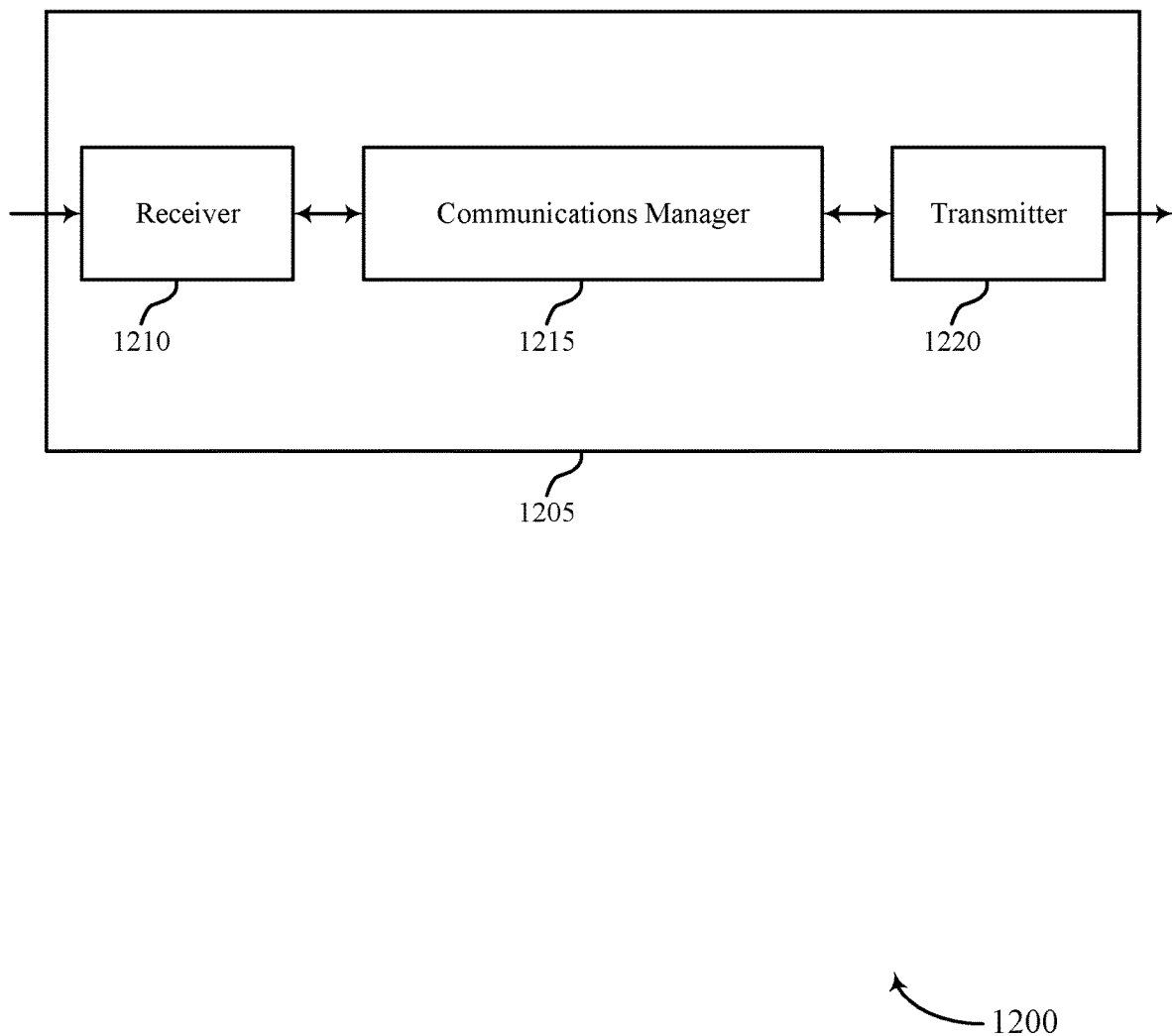
FIGS. 12 and 13 show block diagrams of devices that support configuring uplink control channel resources for communications in a shared radio frequency spectrum in accordance with aspects of the present disclosure.

FIG. 12 shows a block diagram 1200 of a device 1205 that supports configuring uplink control channel resources for communications in a shared radio frequency spectrum in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to configuring uplink control channel resources for communications in a shared radio frequency spectrum, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit a first resource configuration, the resource configuration including a first parameter indicating a first set of TTIs for communicating uplink control information in a shared radio frequency spectrum band, transmit a second resource configuration, the second resource configuration including a third parameter indicating the determined second set of TTIs, and determine a second set of TTIs for receiving uplink control information in the shared radio frequency spectrum band based on a number of instances of uplink control information that were received during the first set of TTIs. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
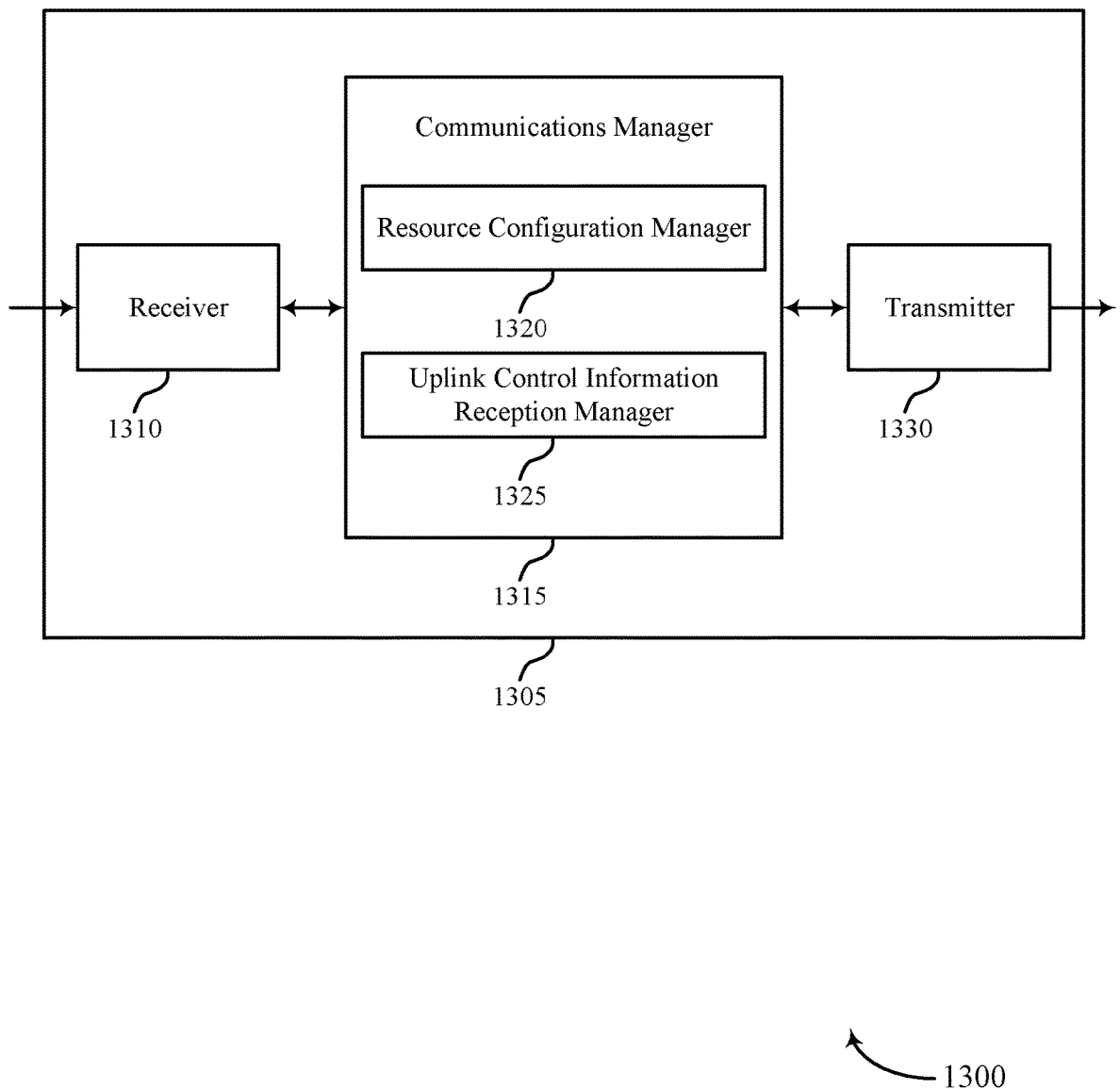

FIG. 13 shows a block diagram 1300 of a device 1305 that supports configuring uplink control channel resources for communications in a shared radio frequency spectrum in accordance with aspects of the present disclosure. The device 1305 may be an example of aspects of a device 1205, or a base station 105 as described herein. The device 1305 may include a receiver 1310, a communications manager 1315, and a transmitter 1330. The device 1305 may also include a processor. Each of these components may be in communication with one another (e.g., via one or more buses).

The receiver 1310 may receive information such as packets, user data, or control information associated with various information channels (e.g., control channels, data channels, and information related to configuring uplink control channel resources for communications in a shared radio frequency spectrum, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a resource configuration manager 1320 and an uplink control information reception manager 1325. The communications manager 1315 may be an example of aspects of the communications manager 1510 described herein.

The resource configuration manager 1320 may transmit a first resource configuration, the resource configuration including a first parameter indicating a first set of TTIs for communicating uplink control information in a shared radio frequency spectrum band and transmit a second resource configuration, the second resource configuration including a third parameter indicating the determined second set of TTIs.

The uplink control information reception manager 1325 may determine a second set of TTIs for receiving uplink control information in the shared radio frequency spectrum band based on a number of instances of uplink control information that were received during the first set of TTIs.

The transmitter 1330 may transmit signals generated by other components of the device 1305. In some examples, the transmitter 1330 may be collocated with a receiver 1310 in a transceiver module. For example, the transmitter 1330 may be an example of aspects of the transceiver 1520 described with reference to FIG. 15. The transmitter 1330 may utilize a single antenna or a set of antennas.

Figure 14:
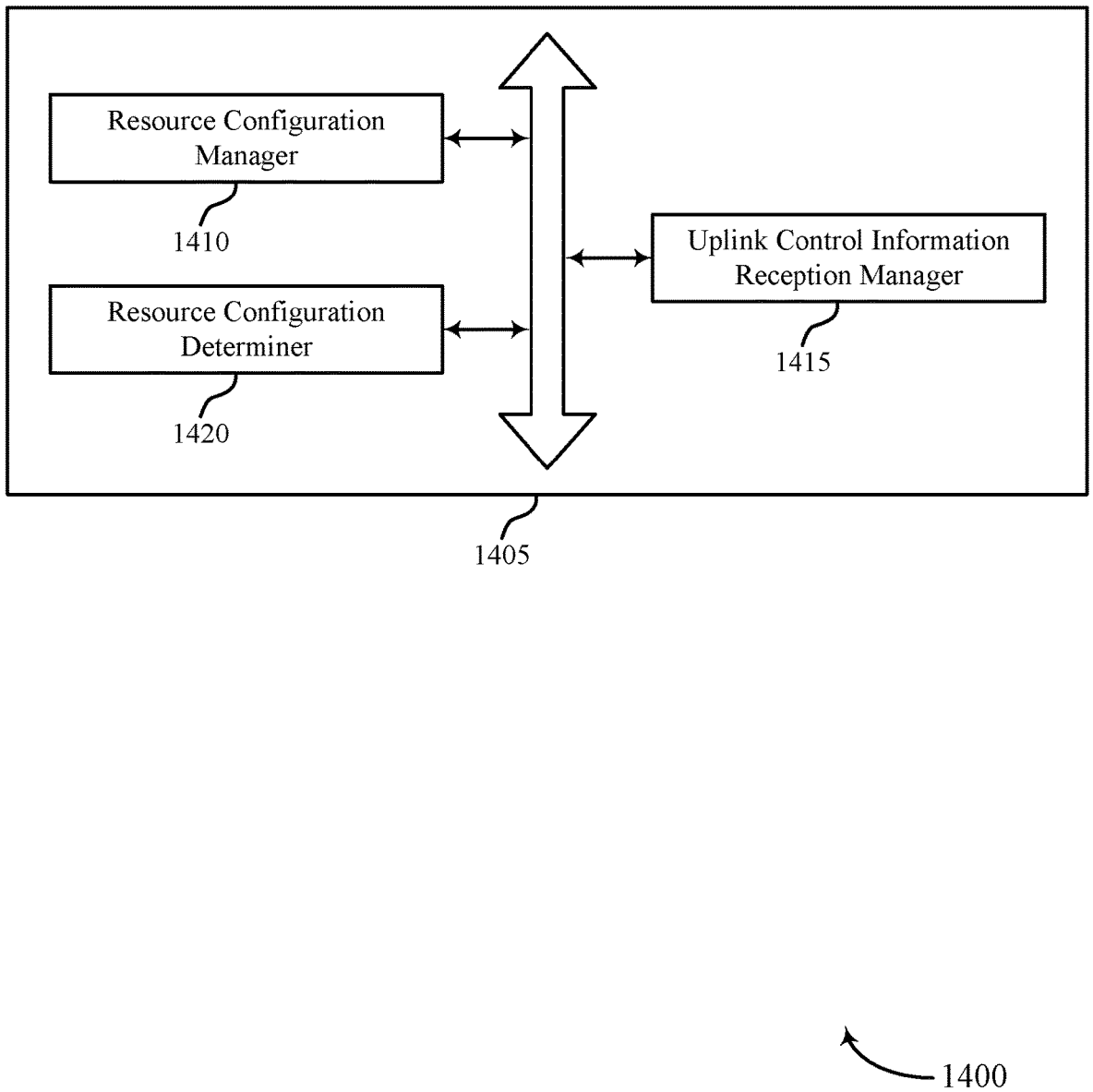
FIG. 14 shows a block diagram of a communications manager that supports configuring uplink control channel resources for communications in a shared radio frequency spectrum in accordance with aspects of the present disclosure.

FIG. 14 shows a block diagram 1400 of a communications manager 1405 that supports configuring uplink control channel resources for communications in a shared radio frequency spectrum in accordance with aspects of the present disclosure. The communications manager 1405 may be an example of aspects of a communications manager 1215, a communications manager 1315, or a communications manager 1510 described herein. The communications manager 1405 may include a resource configuration manager 1410, an uplink control information reception manager 1415, and a resource configuration determiner 1420. Each of these modules may communicate, directly or indirectly, with one another (e.g., via one or more buses).

The resource configuration manager 1410 may transmit a first resource configuration, the resource configuration including a first parameter indicating a first set of TTIs for communicating uplink control information in a shared radio frequency spectrum band. In some examples, the resource configuration manager 1410 may transmit a second resource configuration, the second resource configuration including a third parameter indicating the determined second set of TTIs.

The uplink control information reception manager 1415 may determine a second set of TTIs for receiving uplink control information in the shared radio frequency spectrum band based on a number of instances of uplink control information that were received during the first set of TTIs. In some cases, the uplink control information is transmitted using a physical uplink control channel.

The resource configuration determiner 1420 may determine the second set of TTIs for receiving uplink control information based on the number of instances of uplink control information that were received during the first set of TTIs exceeding a threshold number of instances, where a number of TTIs of the second set of TTIs is greater than a number of TTIs of the first set of TTIs. In some examples, the resource configuration determiner 1420 may determine the second set of TTIs for receiving uplink control information based on the number of instances of uplink control information that were received during the first set of TTIs not exceeding a threshold number of instances, where a number of TTIs of the second set of TTIs is less than a number of TTIs of the first set of TTIs.

Figure 15:
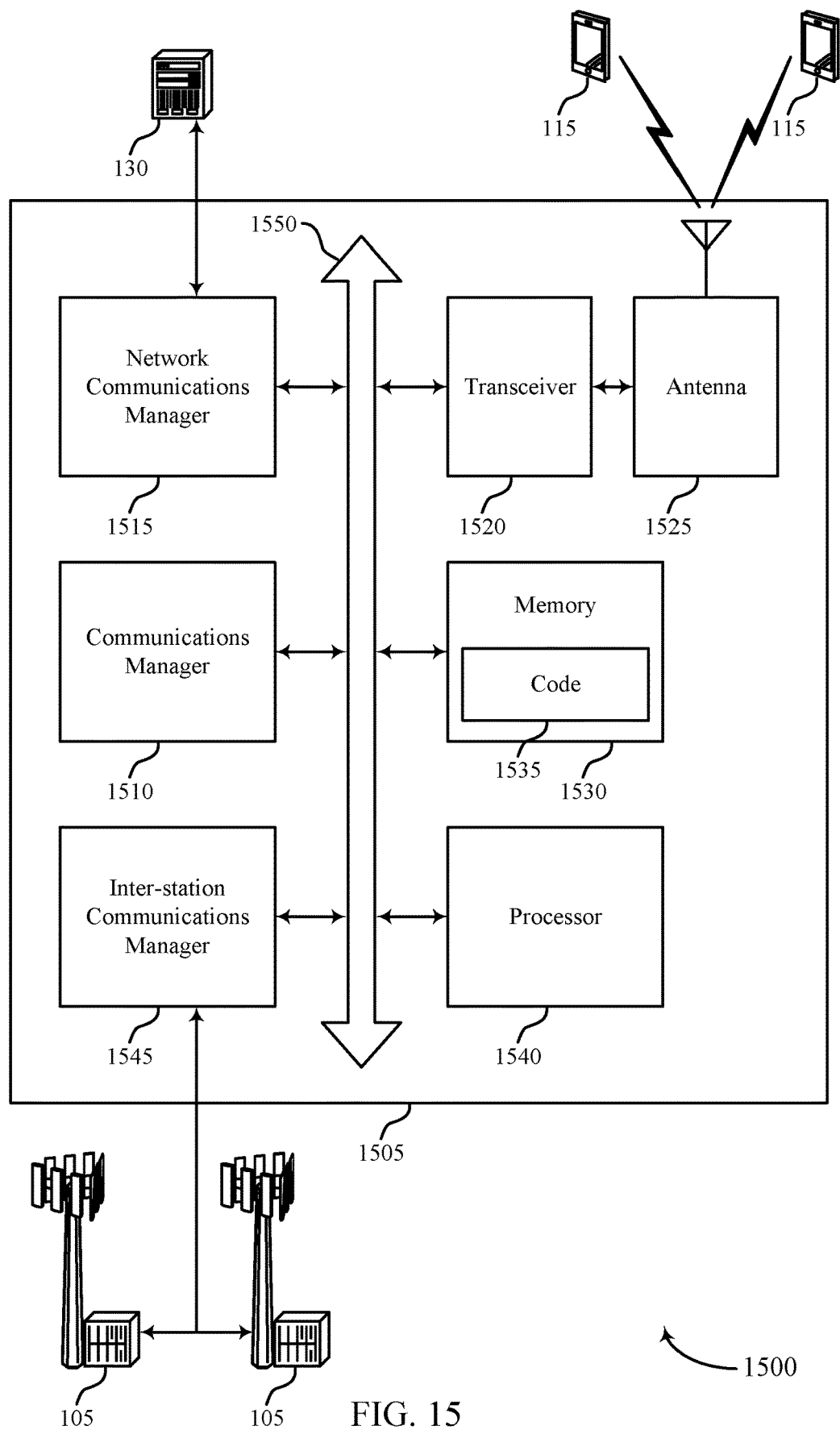
FIG. 15 shows a diagram of a system including a device that supports configuring uplink control channel resources for communications in a shared radio frequency spectrum in accordance with aspects of the present disclosure.

FIG. 15 shows a diagram of a system 1500 including a device 1505 that supports configuring uplink control channel resources for communications in a shared radio frequency spectrum in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit a first resource configuration, the resource configuration including a first parameter indicating a first set of TTIs for communicating uplink control information in a shared radio frequency spectrum band, transmit a second resource configuration, the second resource configuration including a third parameter indicating the determined second set of TTIs, and determine a second set of TTIs for receiving uplink control information in the shared radio frequency spectrum band based on a number of instances of uplink control information that were received during the first set of TTIs.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting configuring uplink control channel resources for communications in a shared radio frequency spectrum).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
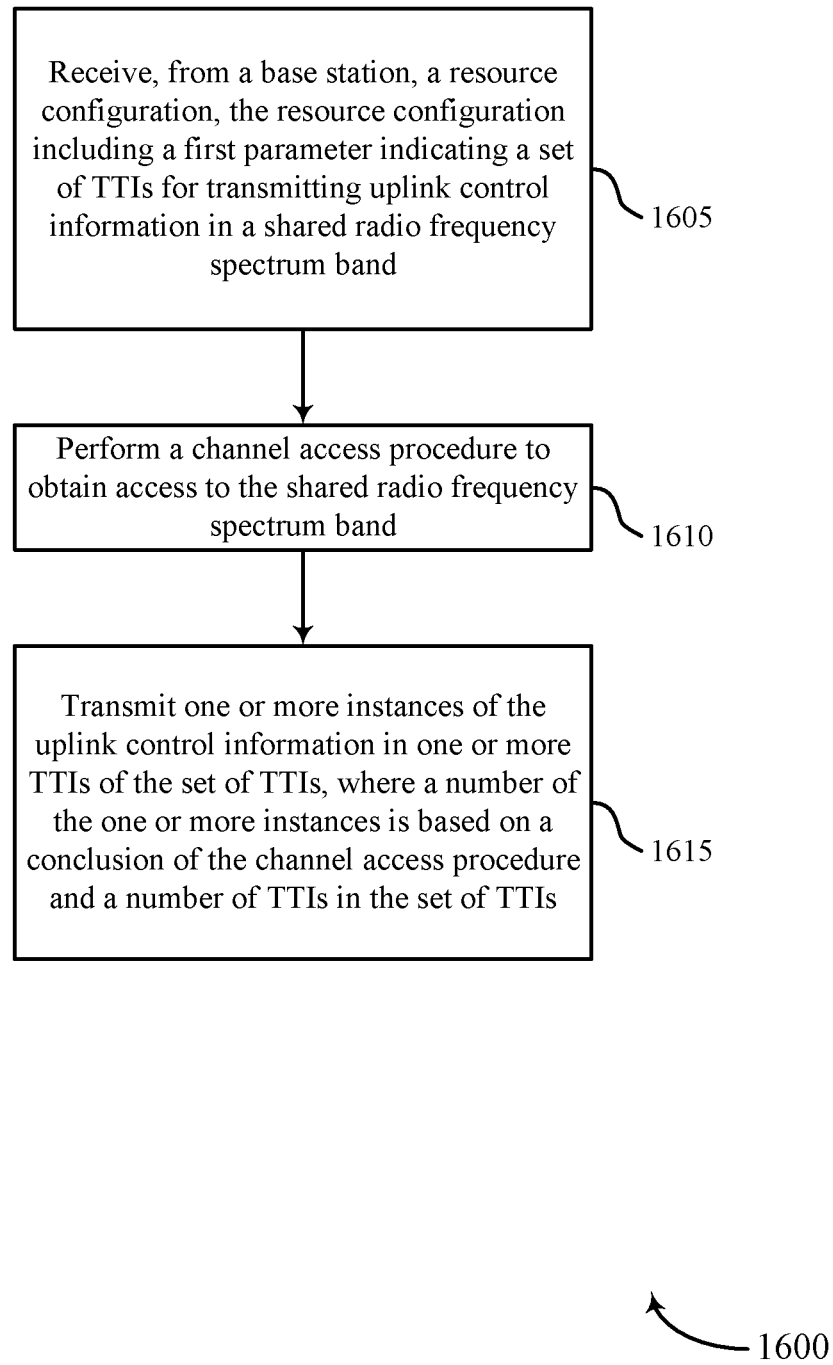
FIGS. 16 through 19 show flowcharts illustrating methods that support configuring uplink control channel resources for communications in a shared radio frequency spectrum in accordance with aspects of the present disclosure.

FIG. 16 shows a flowchart illustrating a method 1600 that supports configuring uplink control channel resources for communications in a shared radio frequency spectrum in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, a resource configuration, the resource configuration including a first parameter indicating a set of TTIs for transmitting uplink control information in a shared radio frequency spectrum band. The operations of 1605 may be performed according to the methods described herein. In some examples, aspects of the operations of 1605 may be performed by a UE resource configuration manager as described with reference to FIGS. 8 through 11.

At 1610, the UE may perform a channel access procedure to obtain access to the shared radio frequency spectrum band. The operations of 1610 may be performed according to the methods described herein. In some examples, aspects of the operations of 1610 may be performed by a channel access procedure manager as described with reference to FIGS. 8 through 11.

At 1615, the UE may transmit one or more instances of the uplink control information in one or more TTIs of the set of TTIs, where a number of the one or more instances is based on a conclusion of the channel access procedure and a number of TTIs in the set of TTIs. The operations of 1615 may be performed according to the methods described herein. In some examples, aspects of the operations of 1615 may be performed by an uplink control information manager as described with reference to FIGS. 8 through 11.

Figure 17:
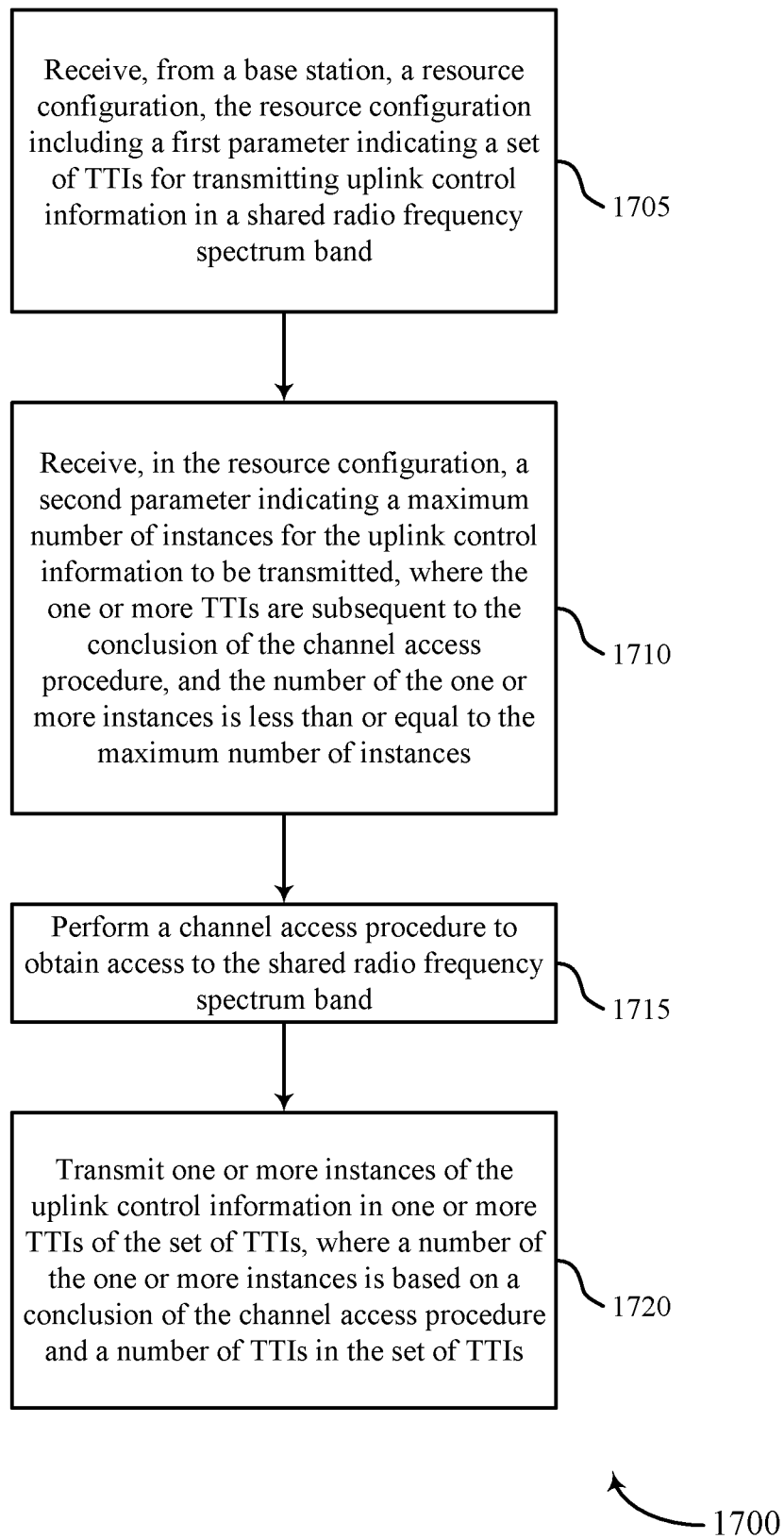

FIG. 17 shows a flowchart illustrating a method 1700 that supports configuring uplink control channel resources for communications in a shared radio frequency spectrum in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, a resource configuration, the resource configuration including a first parameter indicating a set of TTIs for transmitting uplink control information in a shared radio frequency spectrum band. The operations of 1705 may be performed according to the methods described herein. In some examples, aspects of the operations of 1705 may be performed by a UE resource configuration manager as described with reference to FIGS. 8 through 11.

At 1710, the UE may receive, in the resource configuration, a second parameter indicating a maximum number of instances for the uplink control information to be transmitted, where the one or more TTIs are subsequent to the conclusion of the channel access procedure, and the number of the one or more instances is less than or equal to the maximum number of instances. The operations of 1710 may be performed according to the methods described herein. In some examples, aspects of the operations of 1710 may be performed by a UE resource configuration manager as described with reference to FIGS. 8 through 11.

At 1715, the UE may perform a channel access procedure to obtain access to the shared radio frequency spectrum band. The operations of 1715 may be performed according to the methods described herein. In some examples, aspects of the operations of 1715 may be performed by a channel access procedure manager as described with reference to FIGS. 8 through 11.

At 1720, the UE may transmit one or more instances of the uplink control information in one or more TTIs of the set of TTIs, where a number of the one or more instances is based on a conclusion of the channel access procedure and a number of TTIs in the set of TTIs. The operations of 1720 may be performed according to the methods described herein. In some examples, aspects of the operations of 1720 may be performed by an uplink control information manager as described with reference to FIGS. 8 through 11.

Figure 18:
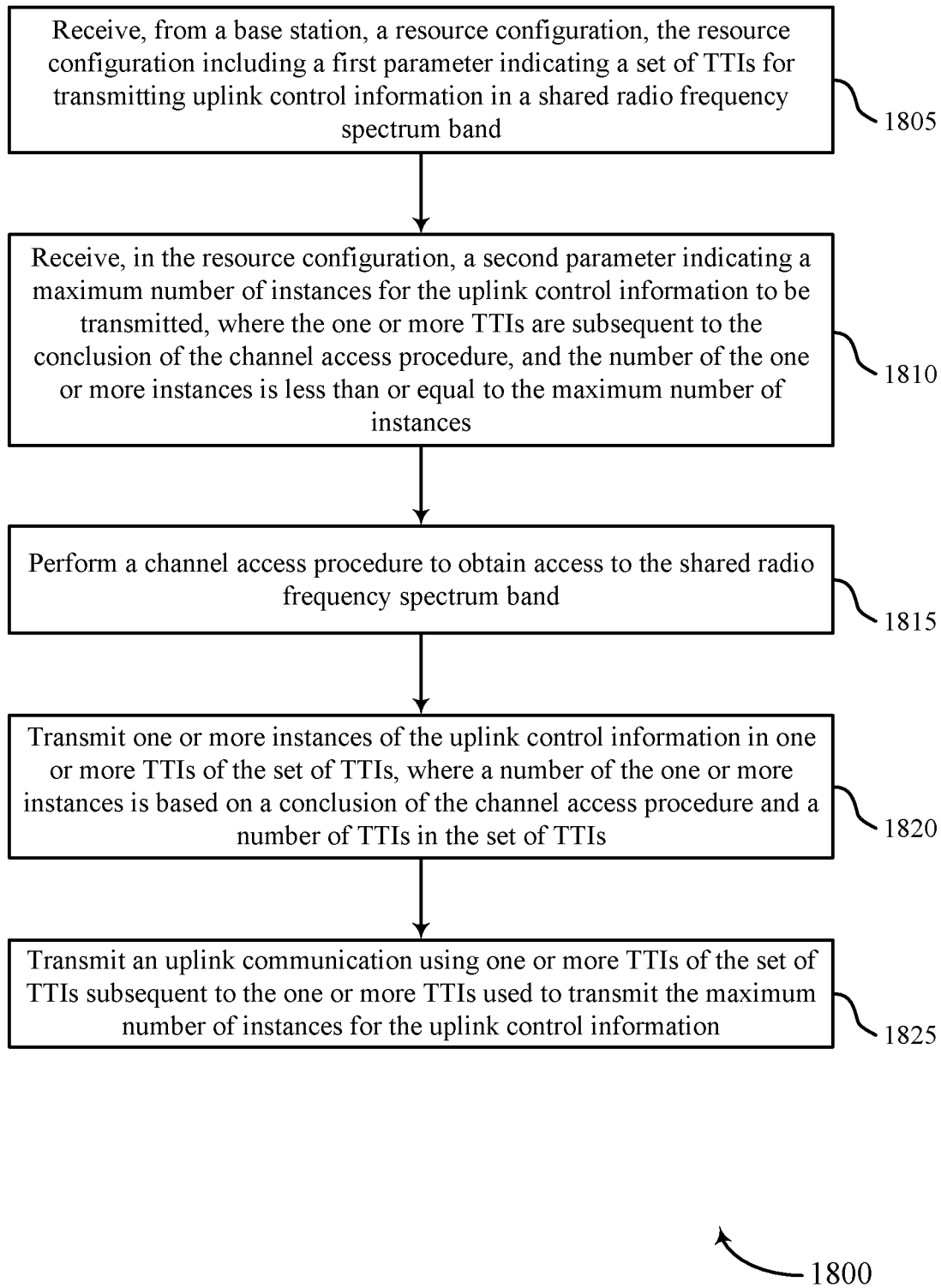

FIG. 18 shows a flowchart illustrating a method 1800 that supports configuring uplink control channel resources for communications in a shared radio frequency spectrum in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, a resource configuration, the resource configuration including a first parameter indicating a set of TTIs for transmitting uplink control information in a shared radio frequency spectrum band. The operations of 1805 may be performed according to the methods described herein. In some examples, aspects of the operations of 1805 may be performed by a UE resource configuration manager as described with reference to FIGS. 8 through 11.

At 1810, the UE may receive, in the resource configuration, a second parameter indicating a maximum number of instances for the uplink control information to be transmitted, where the one or more TTIs are subsequent to the conclusion of the channel access procedure, and the number of the one or more instances is less than or equal to the maximum number of instances. The operations of 1810 may be performed according to the methods described herein. In some examples, aspects of the operations of 1810 may be performed by a UE resource configuration manager as described with reference to FIGS. 8 through 11.

At 1815, the UE may perform a channel access procedure to obtain access to the shared radio frequency spectrum band. The operations of 1815 may be performed according to the methods described herein. In some examples, aspects of the operations of 1815 may be performed by a channel access procedure manager as described with reference to FIGS. 8 through 11.

At 1820, the UE may transmit one or more instances of the uplink control information in one or more TTIs of the set of TTIs, where a number of the one or more instances is based on a conclusion of the channel access procedure and a number of TTIs in the set of TTIs. The operations of 1820 may be performed according to the methods described herein. In some examples, aspects of the operations of 1820 may be performed by an uplink control information manager as described with reference to FIGS. 8 through 11.

At 1825, the UE may transmit an uplink communication using one or more TTIs of the set of TTIs subsequent to the one or more TTIs used to transmit the maximum number of instances for the uplink control information. The operations of 1825 may be performed according to the methods described herein. In some examples, aspects of the operations of 1825 may be performed by an uplink communication manager as described with reference to FIGS. 8 through 11.

Figure 19:
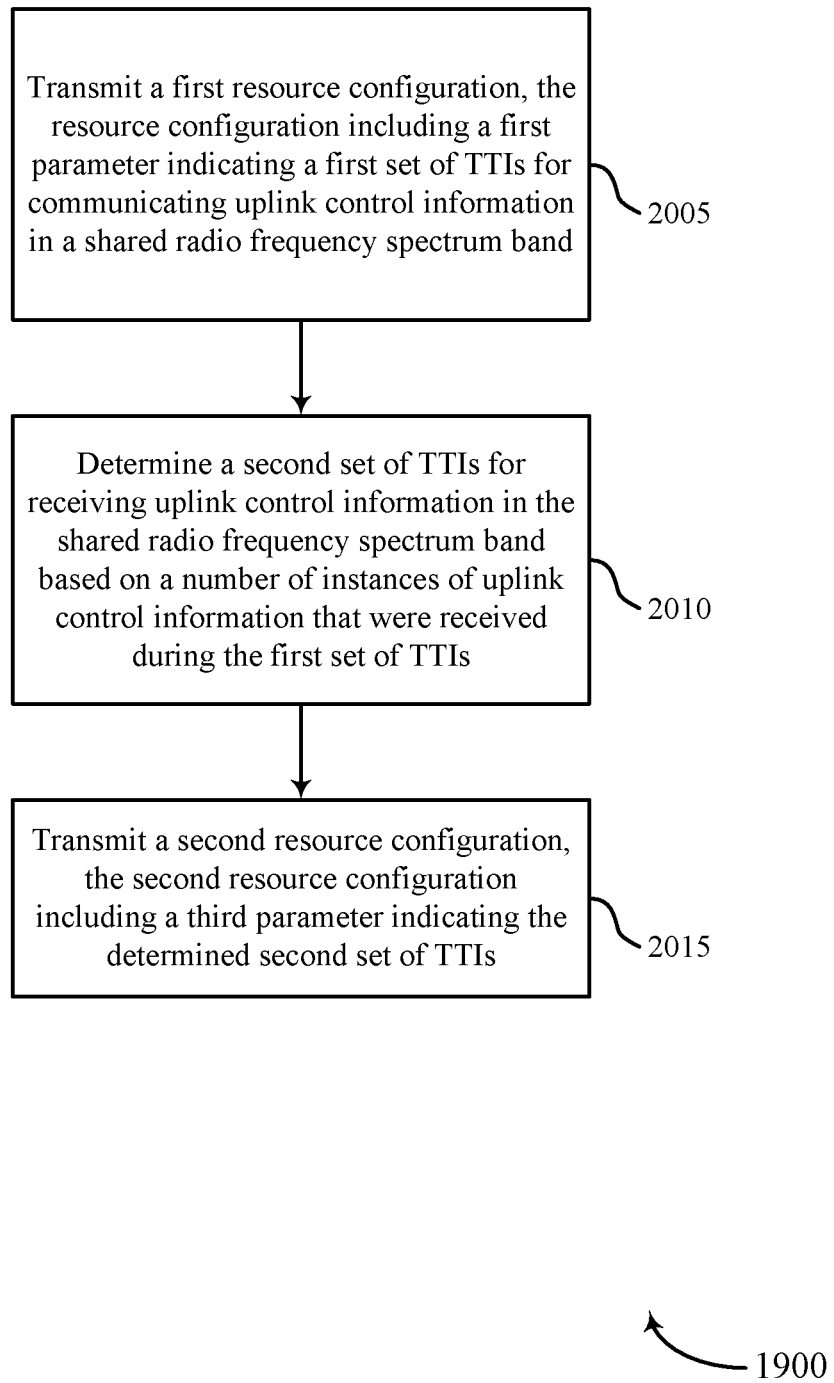

FIG. 19 shows a flowchart illustrating a method 1900 that supports configuring uplink control channel resources for communications in a shared radio frequency spectrum in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may transmit a first resource configuration, the resource configuration including a first parameter indicating a first set of TTIs for communicating uplink control information in a shared radio frequency spectrum band. The operations of 1905 may be performed according to the methods described herein. In some examples, aspects of the operations of 1905 may be performed by a resource configuration manager as described with reference to FIGS. 12 through 15.

At 1910, the base station may determine a second set of TTIs for receiving uplink control information in the shared radio frequency spectrum band based on a number of instances of uplink control information that were received during the first set of TTIs. The operations of 1910 may be performed according to the methods described herein. In some examples, aspects of the operations of 1910 may be performed by an uplink control information reception manager as described with reference to FIGS. 12 through 15.

At 1915, the base station may transmit a second resource configuration, the second resource configuration including a third parameter indicating the determined second set of TTIs. The operations of 1915 may be performed according to the methods described herein. In some examples, aspects of the operations of 1915 may be performed by a resource configuration manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code-division multiple access (CDMA), time-division multiple access (TDMA), frequency-division multiple access (FDMA), orthogonal frequency-division multiple access (OFDMA), single-carrier frequency-division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, from a base station, a resource configuration, indicating a set of transmission time intervals (TTIs) for transmitting uplink control information in a shared radio frequency spectrum band and a maximum number of instances for the uplink control information;
   performing a channel access procedure to obtain access to the shared radio frequency spectrum band; and
   transmitting one or more instances of the uplink control information in one or more TTIs of the set of TTIs, wherein a number of the one or more instances is based at least in part on a conclusion of the channel access procedure a number of TTIs in the set of TTIs, and the maximum number of instances for the uplink control information.

2. The method of claim 1, wherein the channel access procedure comprises a listen-before-talk procedure.

3. The method of claim 1,
   wherein the one or more TTIs are subsequent to the conclusion of the channel access procedure, and the number of the one or more instances is less than or equal to the maximum number of instances.

4. The method of claim 3, wherein the one or more instances of the uplink control information comprise one or more indexes corresponding to indexes of the one or more TTIs.

5. The method of claim 4, wherein the one or more indexes indicate a last instance of the uplink control information.

6. The method of claim 3, further comprising:
   transmitting an uplink communication using one or more TTIs of the set of TTIs that are subsequent to the one or more TTIs.

7. The method of claim 6, wherein the uplink communication comprises a physical uplink shared channel transmission, a physical random access channel transmission, a reference signal, or a combination thereof.

8. The method of claim 1, wherein the one or more TTIs are subsequent to the conclusion of the channel access procedure, and the number of the one or more instances is based at least in part on a number of the one or more TTIs that are subsequent to the conclusion of the channel access procedure.

9. The method of claim 1, further comprising:
   receiving an indication not to transmit one or more instances of the uplink control information during the one or more TTIs based at least in part on transmitting at least one instance of the uplink control information.

10. The method of claim 1, further comprising:
    transmitting the one or more instances of the uplink control information in one or more TTIs of the set of TTIs that are subsequent to the conclusion of the channel access procedure, wherein the number of the one or more instances is based at least in part on a failure to obtain access to the shared radio frequency spectrum band during the channel access procedure.

11. The method of claim 1, wherein the resource configuration indicates time-frequency resources for transmitting uplink control information in each TTI of the set of TTIs.

12. The method of claim 1, wherein the resource configuration indicates a spatial relationship for one or more transmit beams to be used for transmitting the one or more instances of the uplink control information.

13. The method of claim 1, wherein the one or more TTIs are contiguous in time, frequency, or both.

14. The method of claim 1, wherein the one or more TTIs are not contiguous in time, frequency, or both.

15. The method of claim 1, wherein transmitting the uplink control information comprises:
    transmitting the one or more instances of the uplink control information using a physical uplink control channel.

16. An apparatus for wireless communications at a user equipment (UE), comprising:
    a processor;
    memory in electronic communication with the processor; and
    instructions stored in the memory, wherein the instructions are executable by the processor to:

receive, from a base station, a resource configuration, indicating a set of transmission time intervals (TTIs) for transmitting uplink control information in a shared radio frequency spectrum band and a maximum number of instances for the uplink control information;

perform a channel access procedure to obtain access to the shared radio frequency spectrum band; and transmit one or more instances of the uplink control information in one or more TTIs of the set of TTIs, wherein a number of the one or more instances is based at least in part on a conclusion of the channel access procedure a number of TTIs in the set of TTIs, and the maximum number of instances for the uplink control information.

17. The apparatus of claim 16, wherein the channel access procedure comprises a listen-before-talk procedure.

18. The apparatus of claim 16,
wherein the one or more TTIs are subsequent to the conclusion of the channel access procedure, and the number of the one or more instances is less than or equal to the maximum number of instances.

19. The apparatus of claim 18, wherein the one or more instances of the uplink control information comprise one or more indexes corresponding to indexes of the one or more TTIs.

20. The apparatus of claim 19, wherein the one or more indexes indicate a last instance of the uplink control information.

21. The apparatus of claim 18, wherein the instructions are further executable by the processor to:
transmit an uplink communication using one or more TTIs of the set of TTIs that are subsequent to the one or more TTIs.

22. The apparatus of claim 21, wherein the uplink communication comprises a physical uplink shared channel transmission, a physical random access channel transmission, a reference signal, or a combination thereof.

23. The apparatus of claim 16, wherein the one or more TTIs are subsequent to the conclusion of the channel access procedure, and the number of the one or more instances is based at least in part on a number of the one or more TTIs that are subsequent to the conclusion of the channel access procedure.

24. The apparatus of claim 16, wherein the instructions are further executable by the processor to:
receive an indication not to transmit one or more instances of the uplink control information during the one or more TTIs based at least in part on transmitting at least one instance of the uplink control information.

25. The apparatus of claim 16, wherein the instructions are further executable by the processor to:
transmit the one or more instances of the uplink control information in one or more TTIs of the set of TTIs that are subsequent to the conclusion of the channel access procedure, wherein the number of the one or more instances is based at least in part on a failure to obtain access to the shared radio frequency spectrum band during the channel access procedure.

26. The apparatus of claim 16, wherein the resource configuration indicates time-frequency resources for transmitting uplink control information in each TTI of the set of TTIs.

27. The apparatus of claim 16, wherein the resource configuration indicates a spatial relationship for one or more transmit beams to be used for transmitting the one or more instances of the uplink control information.

28. The apparatus of claim 16, wherein the one or more TTIs are contiguous in time, frequency, or both.

29. The apparatus of claim 16, wherein the one or more TTIs are not contiguous in time, frequency, or both.

30. A non-transitory computer-readable medium storing code for wireless communications at a user equipment (UE), the code comprising instructions executable to:
receive, from a base station, a resource configuration indicating a set of transmission time intervals (TTIs) for transmitting uplink control information in a shared radio frequency spectrum band and a maximum number of instances for the uplink control information;

perform a channel access procedure to obtain access to the shared radio frequency spectrum band; and transmit one or more instances of the uplink control information in one or more TTIs of the set of TTIs, wherein a number of the one or more instances is based at least in part on a conclusion of the channel access procedure a number of TTIs in the set of TTIs, and the maximum number of instances for the uplink control information.

* * * * *